(12) United States Patent
Balasubramanian et al.

(10) Patent No.: US 11,710,403 B2
(45) Date of Patent: Jul. 25, 2023

(54) SIGNALING TECHNIQUES FOR SENSOR FUSION SYSTEMS

(71) Applicant: QUALCOMM Incorporated, San Diego, CA (US)

(72) Inventors: Anantharaman Balasubramanian, San Diego, CA (US); Junyi Li, Franklin Park, NJ (US); Kapil Gulati, Belle Mead, NJ (US); Chang-Sik Choi, Seoul (KR)

(73) Assignee: QUALCOMM Incorporated, San Diego, CA (US)

( * ) Notice: Subject to any disclaimer, the term of this patent is extended or adjusted under 35 U.S.C. 154(b) by 266 days.

(21) Appl. No.: 17/207,170

(22) Filed: Mar. 19, 2021

(65) Prior Publication Data

US 2022/0301428 A1  Sep. 22, 2022

(51) Int. Cl.
*G08G 1/0967* (2006.01)
*H04W 12/60* (2021.01)
*G05D 1/02* (2020.01)
*G05D 1/00* (2006.01)
*H04W 4/40* (2018.01)
*B60W 60/00* (2020.01)

(52) U.S. Cl.
CPC ..... *G08G 1/096783* (2013.01); *B60W 60/001* (2020.02); *G05D 1/0088* (2013.01); *G05D 1/0276* (2013.01); *H04W 4/40* (2018.02); *H04W 12/66* (2021.01); *B60W 2556/50* (2020.02); *G05D 2201/0213* (2013.01)

(58) Field of Classification Search
None
See application file for complete search history.

(56) References Cited

U.S. PATENT DOCUMENTS

2019/0339082 A1* 11/2019 Doig ................... G08G 1/0141

* cited by examiner

Primary Examiner — Thomas S McCormack
(74) Attorney, Agent, or Firm — Arent Fox, LLP

(57) ABSTRACT

This disclosure provides methods, devices and systems for a vehicle user equipment (VUE) to obtain extrinsic information about an object or location. The VUE may transmit a request for information about the object or the location to a road side unit (RSU). The RSU may receive the request and determine a set of extrinsic information for the first UE regarding the object or the location based on a set of information from one or more other UEs. The extrinsic information includes information that is not provided by the VUE. The RSU may transmit the set of extrinsic information to the VUE. The VUE may determine whether to accept a feature of the object or the location in the extrinsic information based on the set of extrinsic information and a set of intrinsic information detected by the VUE, The VUE may select an autonomous driving action based on the accepted feature.

36 Claims, 11 Drawing Sheets

SIGNALING TECHNIQUES FOR SENSOR FUSION SYSTEMS

BACKGROUND

Technical Field

The present disclosure relates generally to communication systems, and more particularly, to signaling techniques for sensor fusion systems.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, the disclosure provides a method of wireless communication for a vehicle user equipment (VUE). The method may include transmitting a request for information about an object or a location to a road side unit (RSU). The method may include receiving a set of extrinsic information for the first VUE regarding the object or the location, wherein the set of extrinsic information includes information not provided by the first VUE to the RSU on the object or the location.

In an aspect, the disclosure provides a method of wireless communication. For example, the method may be performed by a RSU. The method may include receiving, from a first user equipment (UE), a request for information about an object or a location. The method may include determining a set of extrinsic information for the first UE regarding the object or the location based on a set of information from one or more other UEs, wherein the set of extrinsic information includes information not provided by the first UE. The method may include transmitting the set of extrinsic information to the first UE.

In another aspect, the disclosure provides an apparatus for wireless communication. The apparatus may include a memory storing computer-executable instructions and at least one processor coupled with the memory and configured to execute the computer-executable instructions. The at least one processor may be configured to transmit a request for information about an object or a location to a RSU. The at least one processor may be configured to receive a set of extrinsic information for the first VUE regarding the object or the location, wherein the set of extrinsic information includes information not provided by the first VUE to the RSU on the object or the location In another aspect, the disclosure provides an apparatus for wireless communication. The apparatus may include a memory storing computer-executable instructions and at least one processor coupled with the memory and configured to execute the computer-executable instructions. The at least one processor may be configured to receive, from a first UE, a request for information about an object or a location. The at least one processor may be configured to determine a set of extrinsic information for the first UE regarding the object or the location based on a set of information from one or more other UEs, wherein the set of extrinsic information includes information not provided by the first UE. The at least one processor may be configured to transmit the set of extrinsic information to the first UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
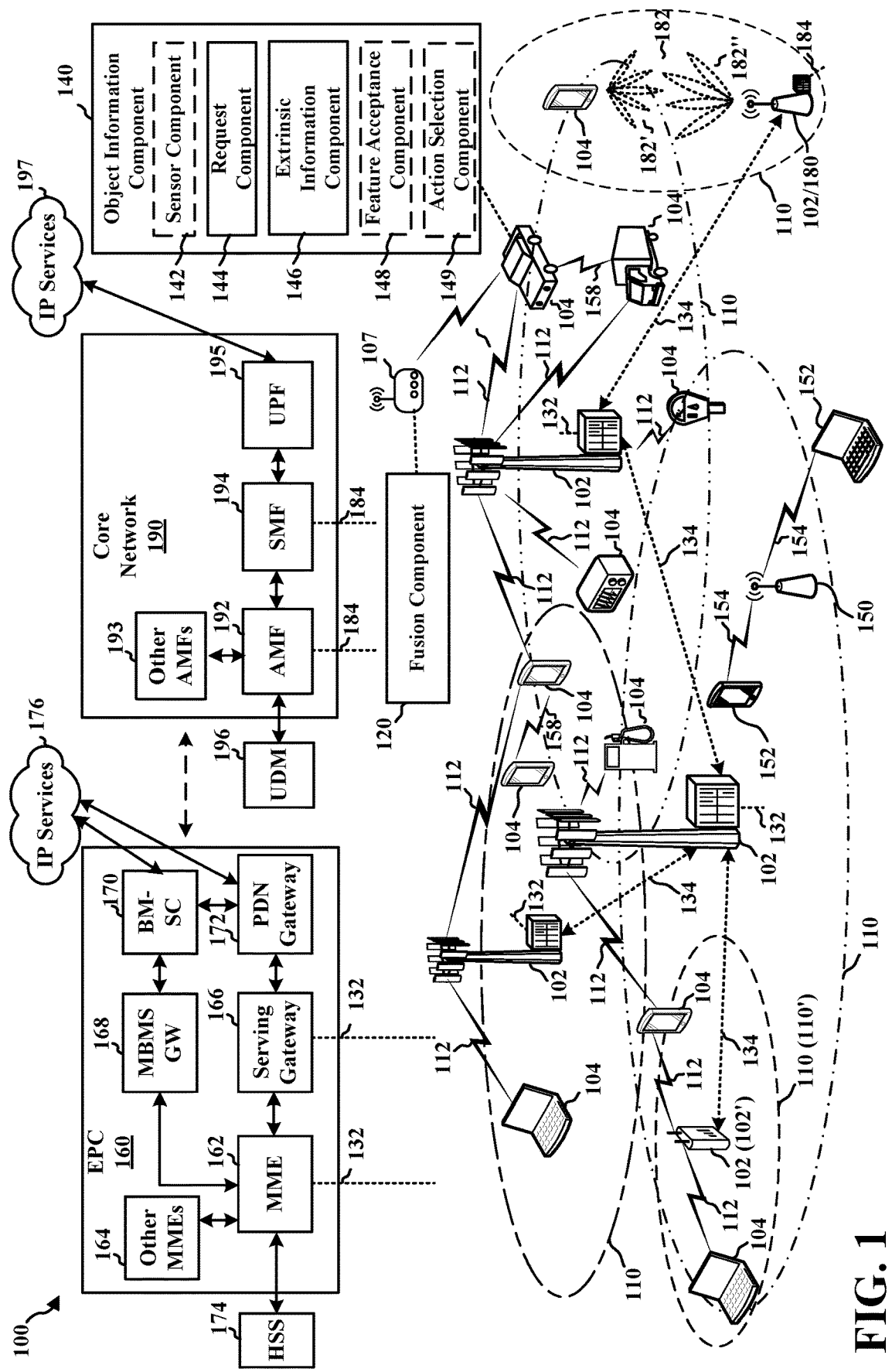
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

A vehicle may be equipped with various sensors to detect a surrounding environment. Information detected by the vehicle may be referred to as intrinsic information. Generally, the vehicle may not be able to sense all objects in the surrounding environment to clearly understand the situational awareness. For example, occluding objects (e.g., buildings) may block sensors from detecting objects such as a pedestrian crossing at an intersection, even if the vehicle were to use multiple sensors (e.g., light detection and ranging (LIDAR), radar, and camera). Additionally, some sensors may provide redundant information and there may be a power penalty in using all the sensors at all the times to obtain situational awareness for the vehicle.

One approach to increasing information available to a vehicle is sensor sharing in which one vehicle obtains information sensed by other vehicles. Such sensor sharing may increase the information available to a vehicle to make decisions. However, sensing of objects by vehicle is prone to errors. Example errors include location error of objects being sensed due to inherent sensor errors and data association errors (e.g., identifying pedestrians close to each other where the bounding boxes of pedestrians completely overlap with each other). While sensor sharing may allow a vehicle to overcome some such errors, there is also the possibility that the vehicle may obtain erroneous information from other vehicles.

In view of the lack of certain features detected by an ego vehicle and presence of incorrect sensor information perceived by the ego vehicle (and other vehicles), it may be desirable for vehicles to be informed of the validity of their perceived sensor information. For example, the decision taken by a vehicle (e.g., applying a brake to avoid colliding with an object) may be dependent on the validity and amount of information the vehicle has. It would be desirable for another node (e.g., a road side unit (RSU)) to inform the vehicle if it does not have complete and correct information. In a system with multiple UEs providing information about multiple objects, sharing all information with all UEs may not be feasible, for example, due to bandwidth constraints.

In an aspect, the present disclosure provides for characterizing information content and validity of a sensed object for informing a first VUE about extrinsic information that is not provided by the first VUE. The first VUE may request information about an object or a location from an RSU. The object may be a physical object detected by the vehicle or VUE such as another vehicle, a pedestrian, a road feature, or other inanimate object. A location may be a geographical position or area. For example, a location may be selected by the first VUE based on a map or a planned travel path without the first VUE necessarily detecting any object at the location. Information about a location may be particular useful when the first VUE is unable to sense the location. In some implementations, the request for information may include the intrinsic information detected by the first VUE. The RSU may determine a set of extrinsic information for the first UE regarding the object or the location based on a set of information from one or more other UEs. The set of extrinsic information includes information not provided by the first UE. In some implementations, if the RSU does not have extrinsic information about the object or location, the RSU may request the other UEs to provide information about the object. Once the RSU determines the set of extrinsic information for the first VUE, the RSU may transmit the set of extrinsic information to the first VUE. The set of extrinsic information may include features about the requested object or location. In some implementations, the set of extrinsic information may include a trust level of a feature of the object or the location based on a number of VUEs agreeing about the feature. The first UE may determine whether to accept the feature of the object or location based on the intrinsic information of the first VUE and the trust level of the feature in the set of extrinsic information. The first VUE may select an autonomous driving action based on the accepted feature of the object or the location.

Particular implementations of the subject matter described in this disclosure can be implemented to realize one or more of the following potential advantages. In some implementations, the described techniques may be used to provide extrinsic information that confirms the intrinsic information detected by the first VUE or fills in missing information or corrects erroneous information in the intrinsic information. Because only extrinsic information that is not provided by the first VUE is transmitted to the first VUE, the described techniques reduce bandwidth and power consumption of sensor sharing. As another example, the trust level of the extrinsic information allows the first VUE to evaluate the reliability of the extrinsic information and avoid relying on erroneous information from other UEs. Thus, a VUE is able to have more complete and reliable information to make better decisions while efficiently managing bandwidth consumed by the shared sensor information.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface), which may be wired or wireless. The base stations 102 configured for 5G NR (collectively referred to as Next Generation RAN (NG-RAN)) may interface with core network 190 through second backhaul links 184, which may be wired or wireless. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 112 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 112 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

In certain aspects, a UE 104, e.g., a transmitting Vehicle User Equipment (VUE) or other UE, may be configured to transmit messages directly to another UE 104, e.g., UE. The communication may be based on V2V/V2X or other D2D communication, such as Proximity Services (ProSe). Communications based on V2V, V2X, and/or D2D may also be transmitted and received by other transmitting and receiving devices, such as Road Side Unit (RSU) 107, etc. Aspects of the communication may be based on PC5 or sidelink communication.

In an aspect of the present disclosure, one or more UEs 104 may include an object information component 140 configured to obtain information about one or more objects in an environment surrounding the UE 104. For example, the UE 104 may be a VUE that obtains information about objects in a driving environment for use in controlling a vehicle. The object information component 140 may optionally include a sensor component 142 configured to detect information about one or more objects. The information detected by the sensor component 142 may be referred to as intrinsic information. The object information component 140 may include a request component 144 configured to transmit a request for information about an object or a location to a road side unit (RSU). The object information component 140 may include an extrinsic information component 146 configured to receive a set of extrinsic information for the VUE regarding the object or the location. The set of extrinsic information may include information not provided by the VUE to the RSU on the object or the location. In some implementation, the object information component 140 may optionally include a feature acceptance component 148 configured to accept a feature of the object or the location based on the set of intrinsic information and the set of extrinsic information. The object information component 140 may optionally include an action selection component 149 configured to select an autonomous driving action based on the accepted feature of the object or the location.

In an aspect of the present disclosure, one or more RSUs 107 may include a fusion component 120 configured to receive information from one or more UEs and fuse the information to provide a set of extrinsic information to a UE. As illustrated in further detail in FIG. 7, the fusion component 120 may include a request receiver 122, an object fusion component 124, an extrinsic information transmitter 126, and an optional query component 128. The request receiver 122 may be configured to receiving, from a first UE, a request for information about an object or a location. The object fusion component 124 may be configured to determine a set of extrinsic information for the first UE regarding the object or the location based on a set of information from one or more other UEs. The set of extrinsic information may include information not provided by the first UE. The extrinsic information transmitter 126 may be configured to transmit the set of extrinsic information to the first UE. The query component may be configured to request, from the one or more other UEs, the set of information and receive the set of information from one or more other UEs.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ES S), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies including future 6G technologies.

Figure 2:
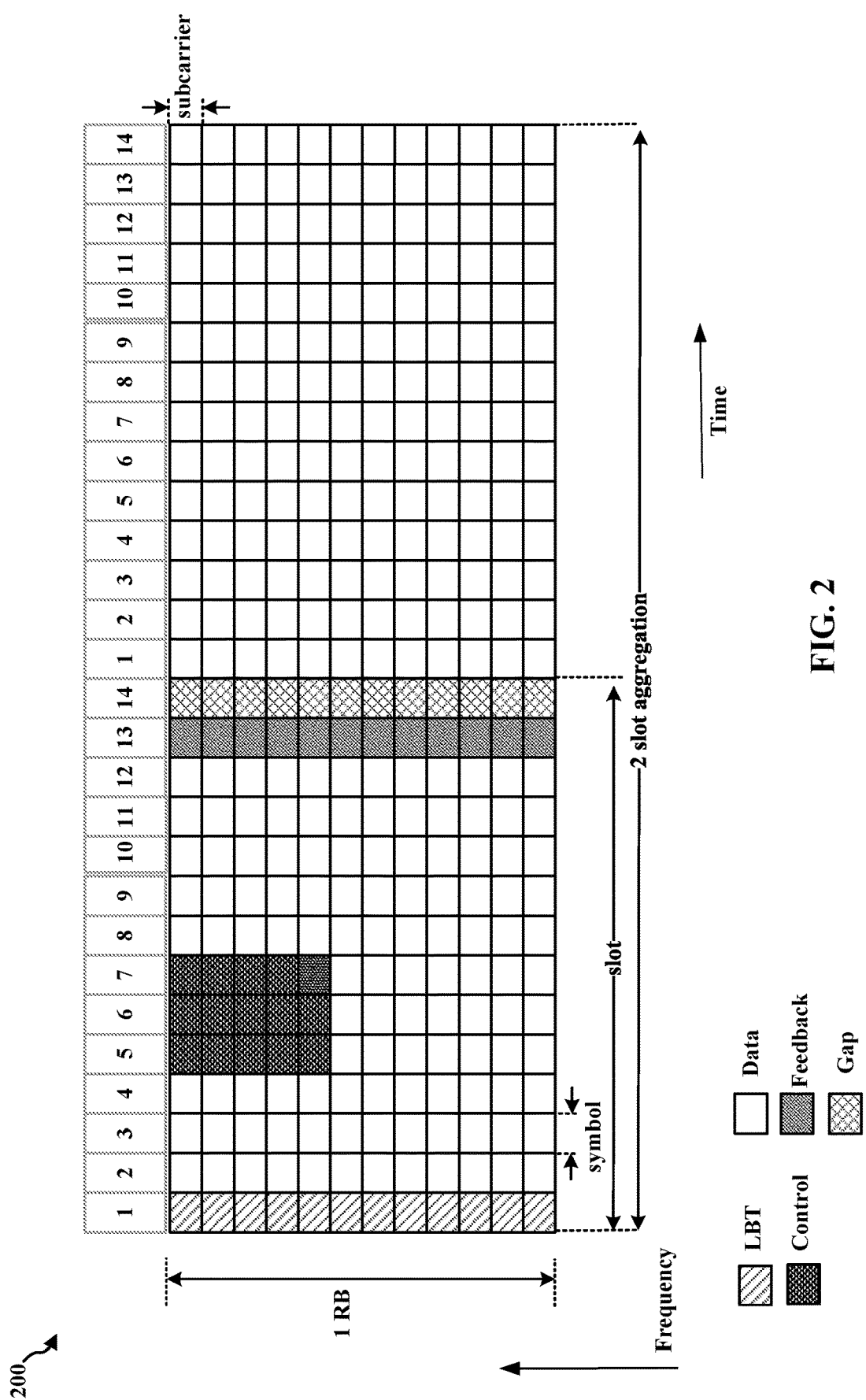
FIG. 2 illustrates an example of a sidelink (SL) slot structure.

FIG. 2 is a diagram 200 illustrating an example of a slot structure that may be used within a 5G/NR frame structure, e.g., for sidelink communication. This is merely one example, and other wireless communication technologies may have a different frame structure and/or different channels. A frame (10 ms) may be divided into 10 equally sized subframes (1 ms). Each subframe may include one or more time slots. Subframes may also include mini-slots, which may include, for example, 7, 4, or 2 symbols. Each slot may include 7 or 14 symbols, depending on the slot configuration. For slot configuration 0, each slot may include 14 symbols, and for slot configuration 1, each slot may include 7 symbols.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may comprise control information, e.g., along with demodulation RS (DM-RS). The control information may comprise Sidelink Control Information (SCI). At least one symbol at the beginning of a slot may be used by a transmitting device to perform a Listen Before Talk (LBT) operation prior to transmitting. At least one symbol may be used for feedback, as described herein. Another symbol, e.g., at the end of the slot may be used as a gap. The gap enables a device to switch from operating as a transmitting device to prepare to operate as a receiving device, e.g., in the following slot and vice versa. Data may be transmitted in the remaining REs, as illustrated. The data may comprise the data message described herein. The position of any of the SCI, feedback, and LBT symbols may be different than the example illustrated in FIG. 2. Multiple slots may be aggregated together. FIG. 2 illustrates an example aggregation of two slots. The aggregated number of slots may also be larger than two. When slots are aggregated, the symbols used for feedback and/or a gap symbol may be different that for a single slot.

Figure 3:
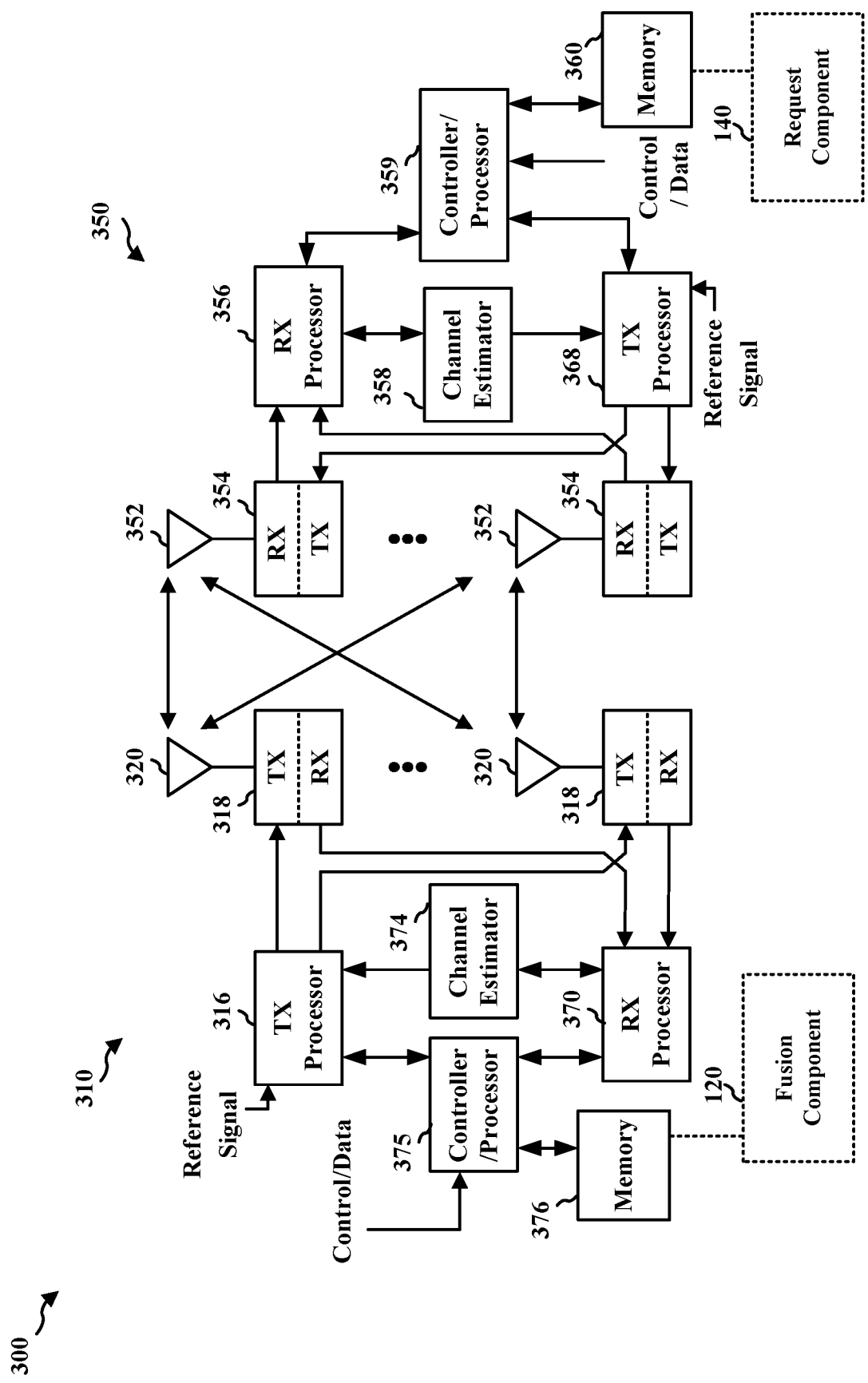
FIG. 3 is a diagram illustrating an example of a first device and a second device involved in wireless communication based, e.g., on vehicle-to-vehicle (V2V), vehicle-to-anything (V2X), and/or device-to-device (D2D) communication.

FIG. 3 is a block diagram 300 of a first wireless communication device 310 in communication with a second wireless communication device 350, e.g., via V2V/V2X/D2D communication. The device 310 may comprise a transmitting device communicating with a receiving device, e.g., device 350, via V2V/V2X/D2D communication. The communication may be based, e.g., on sidelink. The first wireless communication device 310 may comprise a UE, an RSU, etc. The receiving device may comprise a UE, an RSU, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 316, the RX processor 370, and the controller/processor 375 may be configured to perform aspects in connection with the fusion component 120 of FIG. 1. For example, the memory 376 may include executable instructions defining the fusion component 120.

The TX processor 316, the RX processor 370, and/or the controller/processor 375 may be configured to execute the fusion component 120.

At least one of the TX processor 368, the RX processor 356, and the controller/processor 359 may be configured to perform aspects in connection with the object information component 140 of FIG. 1. For example, the memory 360 may include executable instructions defining the object information component 140. The TX processor 368, the RX processor 356, and/or the controller/processor 359 may be configured to execute the object information component 140.

Figure 4:
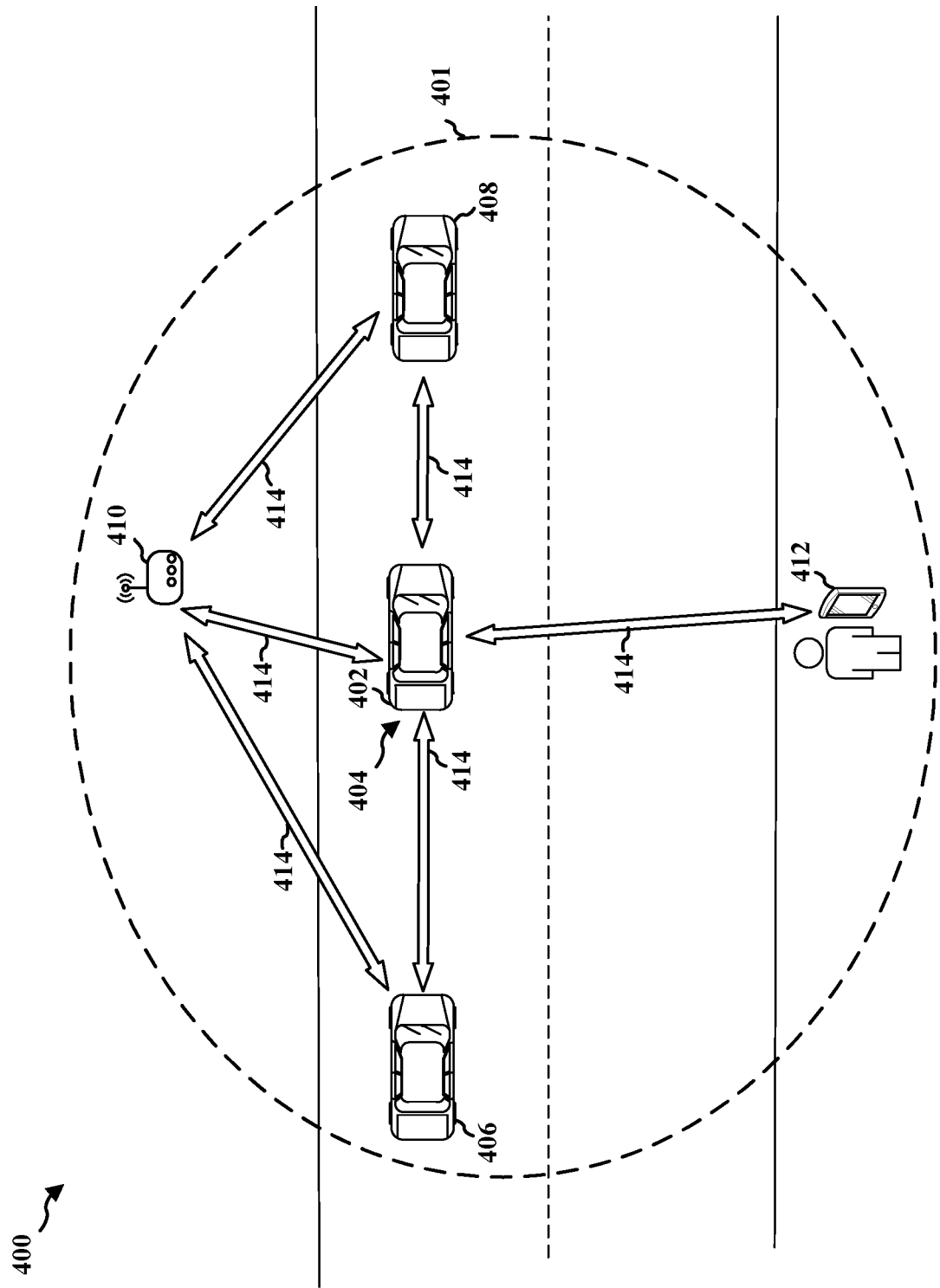
FIG. 4 is a diagram of an example environment for wireless communication between devices based on V2X/V2V/D2D communication.

FIG. 4 illustrates an example environment 400 for wireless communication between devices based on V2X/V2V/D2D communication. A VUE 402 may be located within a vehicle 404. The VUE 402 may transmit transmissions 414, e.g., comprising a control channel and/or a corresponding data channel, that may be received by receiving devices such as vehicles 406, 408, road side unit (RSU) 410, and pedestrian device 412 within a transmission range 401. The receiving devices may each be capable of operating as a transmitting device (e.g., a UE or VUE) in addition to operating as a receiving device. The transmissions 414 may be broadcast or multicast to nearby devices. In an aspect, the VUE 402 may share sensor information with the receiving devices. The transmissions 414 may include information about objects detected by the VUE 402 or the receiving devices. As illustrated, the VUE may be in communication with multiple devices, some of which may detect the same objects. Accordingly, some of the transmissions 414 may be redundant.

Figure 5:
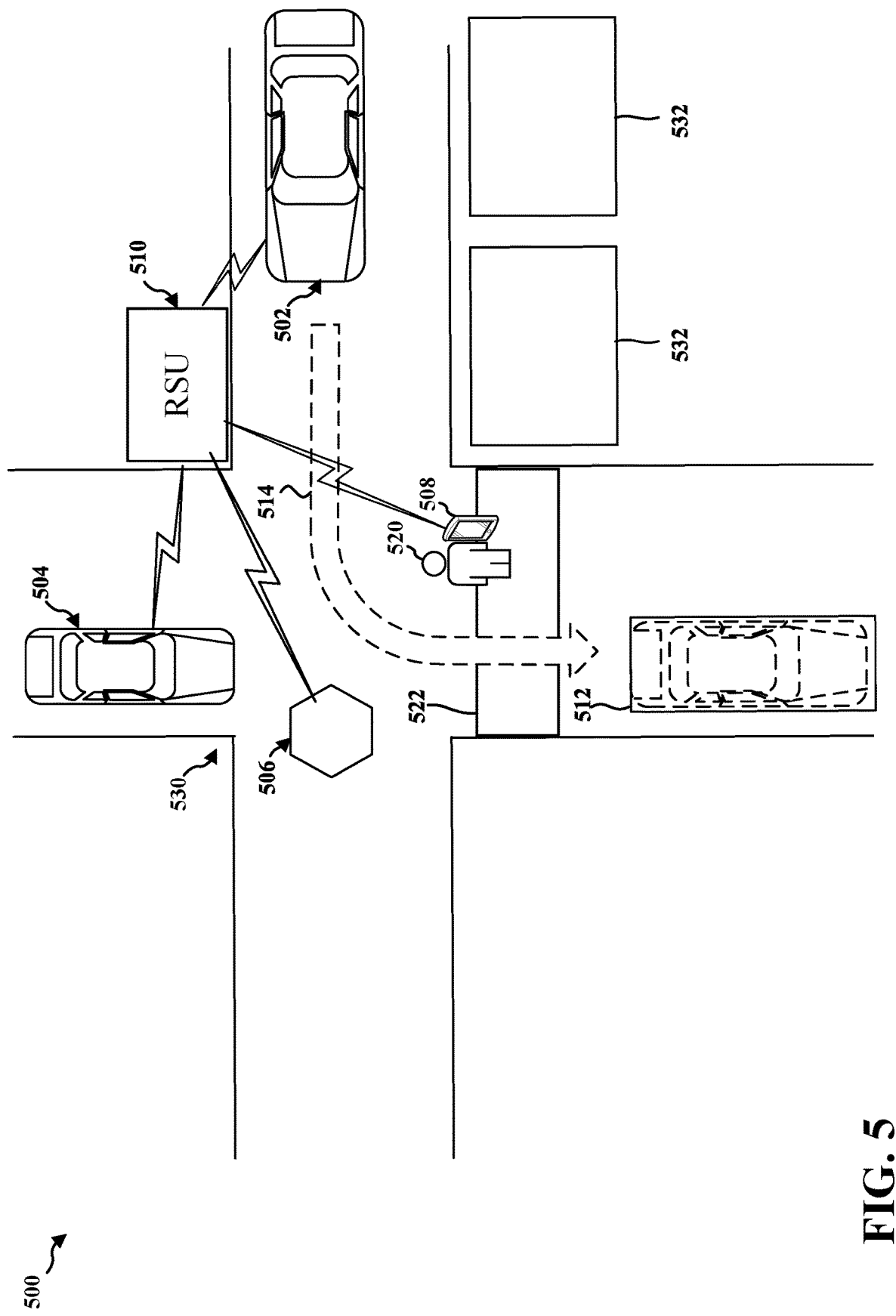
FIG. 5 is a diagram illustrating an example scenario 500 for information fusion.

FIG. 5 schematically illustrates an example scenario 500 for information fusion. In the scenario 500, a first VUE 502 may be approaching an intersection 530. The first VUE 502 may be planning to turn at the intersection 530 and travel to a position 512 following a navigation path 514. The first VUE 502 may be equipped with sensors that obtain information about the intersection 530. For example, the first VUE 502 may include sensors such as one or more cameras, LIDAR devices, radars, or other sensors. The sensors may provide the first VUE 502 with a set of intrinsic information. The intrinsic information may include information about objects or locations detected by the first VUE 502.

In an aspect, the intrinsic information may be incomplete, uncertain, or erroneous. For example, the VUE 502 may not be able to sense all objects around the VUE 502. For instance, occluding objects (e.g., buildings 532) may block sensor perception of a pedestrian crossing 522 near the intersection 530, even if the first VUE 502 were to use all of the available sensors. For example, the VUE 502 may not have information about the pedestrian 520 in the pedestrian crossing 522. As another example, errors may include location error of objects being sensed due to inherent sensor errors or data association errors (e.g., identifying pedestrians close to each other where the bounding boxes of pedestrians completely overlap with each other). For example, the number of pedestrians 520 detected by the VUE 502 may be inaccurate.

In an aspect, the first VUE 502 may request extrinsic information from a road side unit (RSU) 510. The extrinsic information may include information that is not provided by the VUE 502. For example, the RSU 510 may be in communication with a second VUE 504, an infrastructure device 506 (e.g., a traffic control device), or a pedestrian UE 508. The RSU 510 may collect and/or request information from the other devices. For instance, the second VUE 504 may be better able to detect the number or location of the pedestrian 520, or the infrastructure device 506 may know whether the pedestrian crossing 522 is signaled as open. In some implementations, the RSU 510 may include sensors and detect information. The information collected by the other devices may include information that is not included in the intrinsic information of the VUE 502. The RSU 510 may determine the extrinsic information to provide to the first VUE 502.

Figure 6:
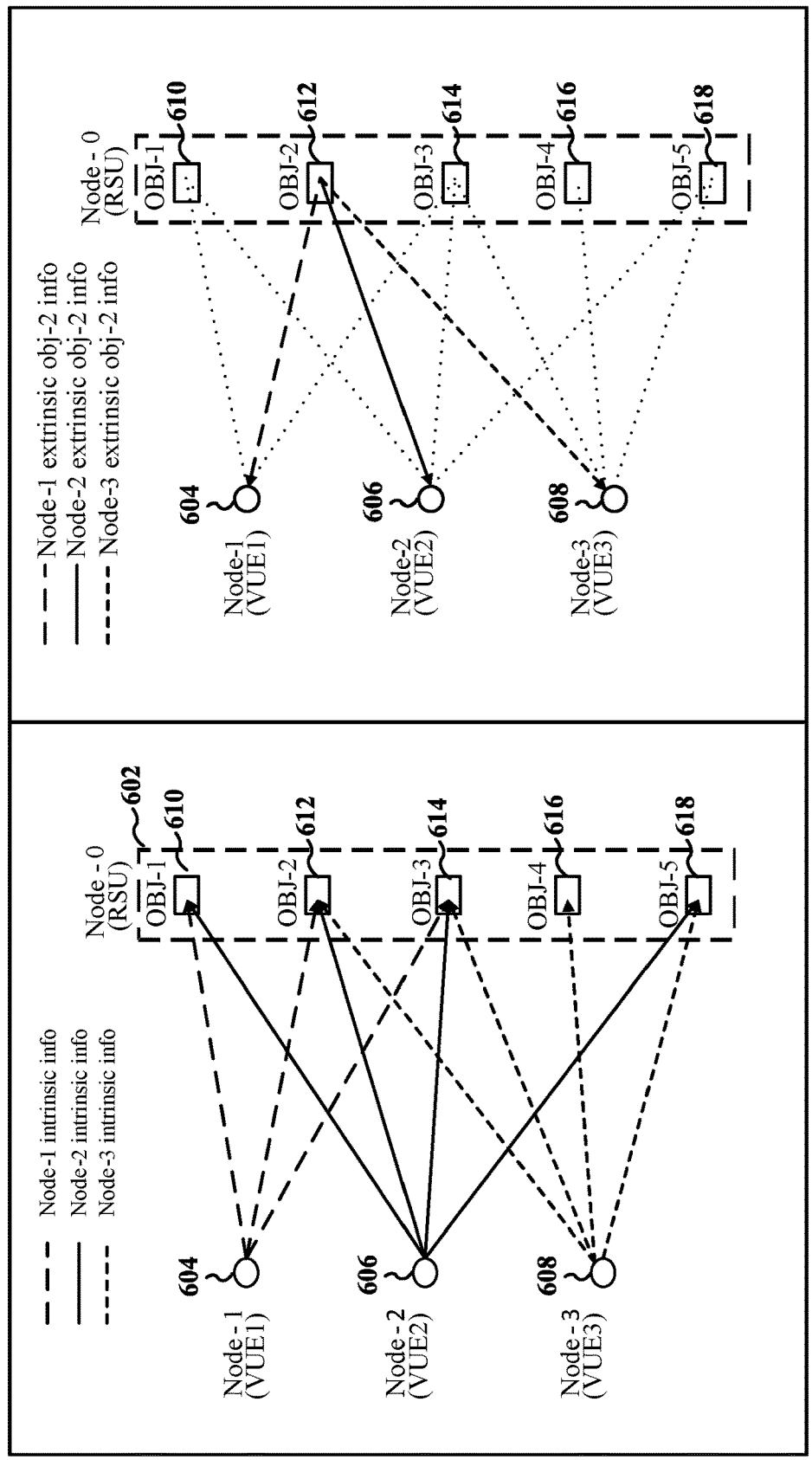
FIG. 6 is a diagram illustrating examples of intrinsic information and extrinsic information about an object.

FIG. 6 is a diagram 600 illustrating examples of intrinsic information and extrinsic information about an object. An object may refer to anything that can be detected by a sensor. For example, objects may include vehicles, pedestrians, or inanimate objects. Objects may have features. For example, any object may have a location and a size. Other features may include a speed or velocity, an object class, a shape, or a color.

A first node 602 (e.g., Node-0, which may be RSU 510) may aggregate information about objects from other nodes. For example, the first node 602 may track information about objects 610, 612, 614, 616, and 618. Other nodes may provide information about one or more objects. For example, a second node 604 (e.g., Node-1 or VUE 502) may detect objects 610, 612, and 614. The second node 604 may report features for each of the objects detected. Similarly, a third node 606 (e.g., Node-2 or VUE 504) may detect objects 610, 612, 614, and 616 and report features of each detected object. Likewise, a fourth node 608 (e.g., Node-3 or infrastructure device 506) may detect objects 612, 614, 616, and 618 and report features of each detected object. The first node 602 may determine when objects reported by different UEs refer to the same object. For example, the first node may match one or more object features such as a location, a size, or an object class to determine that the reports refer to the same object.

The first node 602 may provide extrinsic information to a VUE. For example, the first node 602 may provide extrinsic information about the second object 612 to each of the other nodes 604, 606, 608. The extrinsic information refers to information not possessed originally by the respective node. Accordingly, the extrinsic information may be different for each node. For instance, the extrinsic information about object 612 for the node 604 may include the information reported by the node 606 and the node 608.

Figure 7:
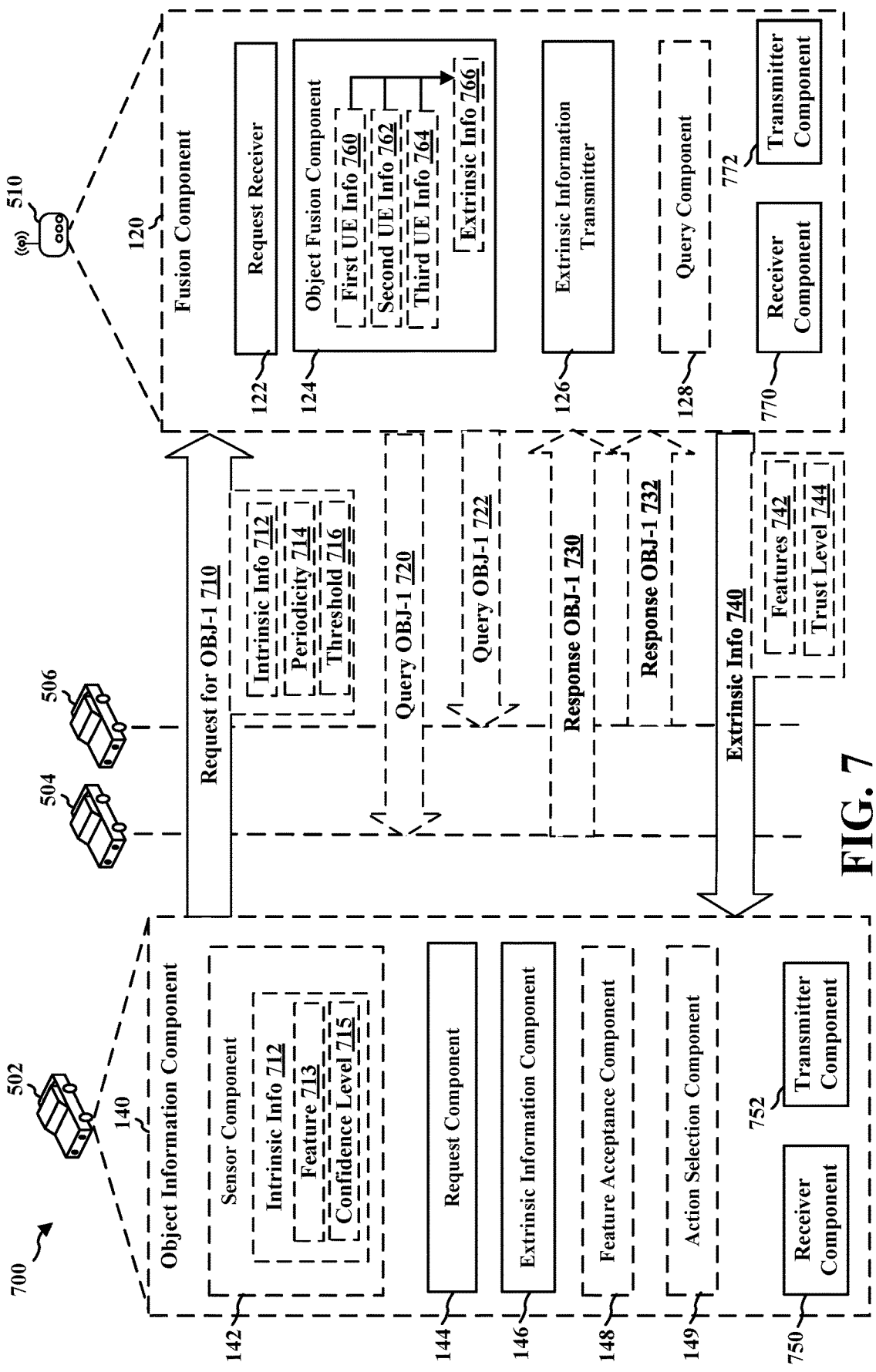
FIG. 7 is a diagram showing example communications and components of a vehicle user equipment (VUE) and a road side unit (RSU).

FIG. 7 is a diagram 700 illustrating example communications and components of a VUE 502, which may be an example of a UE 104 operating in a V2X system. The VUE 502 may request information from a RSU 510 and receive extrinsic information from the RSU 510. The RSU 510 includes the fusion component 120 and the UE 104 includes the object information component 140. The fusion component 120 may be implemented by the memory 376 and the TX processor 316, the RX processor 370, and/or the controller/processor 375 of FIG. 3. For example, the memory 376 may store executable instructions defining the fusion component 120 and the TX processor 316, the RX processor 370, and/or the controller/processor 375 may execute the instructions. The object information component 140 may be implemented by the memory 360 and the TX processor 368, the RX processor 356, and/or the controller/processor 359. For example, the memory 360 may store executable instructions defining the object information component 140 and the TX processor 368, the RX processor 356, and/or the controller/processor 359 may execute the instructions.

As discussed briefly above regarding FIG. 1, the VUE 502 may include an object information component 140, which may include the sensor component 142, the request component 144, the extrinsic information component 146, the feature acceptance component 148, and the action selection component 149. The object information component 140 may also include a receiver component 750 and a transmitter component 752. The receiver component 750 may include, for example, a RF receiver for receiving the signals described herein. The transmitter component 752 may include for example, an RF transmitter for transmitting the signals described herein. In an aspect, the receiver component 750 and the transmitter component 752 may be co-located in a transceiver.

The fusion component 120 may include the request receiver 122, the object fusion component 124, the extrinsic information transmitter 126, and the optional query component 128. The object information component 140 may also include a receiver component 770 and a transmitter component 772. The receiver component 770 may include, for example, a RF receiver for receiving the signals described herein. The transmitter component 772 may include for example, an RF transmitter for transmitting the signals described herein. In an aspect, the receiver component 770 and the transmitter component 772 may be co-located in a transceiver.

The sensor component 142 may include one or more sensors configured to detect objects surrounding the VUE 502. For example, the sensor component 142 may include one or more cameras, LIDAR devices, radar devices, or similar sensors. The sensor component 142 may locally fuse information about detected objects. For example, the sensor component 142 may detect the same object using each of the sensors, but the different sensors may detect different features with differing levels of accuracy. For instance, the sensor component 142 may identify objects in one or more images and compare an approximate object location based on the images to a point cloud generated by a LIDAR or radar device that more accurately measures distances. For each object detected, the sensor component 142 may determine one or more features. A feature may be a piece of information about the object. For example, a feature may have a value. For example, if the sensor component 142 detects a pedestrian, a resulting pedestrian object may have a location (e.g., absolute or relative coordinates), a size, a velocity (direction and speed), and an object class (e.g., pedestrian). The sensor component 142 may determine a confidence level for the properties of the object.

The request component 144 may be configured to transmit a request 710 for information about an object or a location (e.g., OBJ-1) to the RSU 410. In an aspect, the request 710 may be a sidelink communication between the VUE 502 and the RSU 510. The request component 144 may generate the request 710 based on an importance of the object to a control system of the vehicle. For example, the request component 144 may identify objects or locations along the navigation path 514 (e.g., within a threshold distance). The request component 144 may determine whether the VUE 502 has sufficient information regarding each object to select an action. For example, the sufficient information may include a location and velocity of the object with a certain confidence level. If the VUE does not have sufficient information, the request component 144 may generate the request 710.

The fusion component 120 may receive the request 710 (e.g., via the request receiver 122). The fusion component 120 may determine a set of extrinsic information 766 for the first UE regarding the object or the location based on a set of information from one or more other UEs (e.g., first UE info 760, second UE info 762, and third UE info 764). The set of extrinsic information 766 includes information not provided by the first UE. For example, the set of extrinsic information 766 may include a feature that is not included in the intrinsic information 712 or a different value for a feature that is included in the intrinsic information 712. In some implementations, the extrinsic info 766 may include an object that was not detected by the VUE 502.

In some implementations, the fusion component 120 may not have information from other UEs regarding the object or location indicated in the request 710. For example, the second UE info 762 and the third UE info 764 may not have been reported by the corresponding VUE 504 or infrastructure device 506. The fusion component 120 may request the set of information about the object or location from one or more other UEs (e.g., VUE 504 and infrastructure device 506). For example, the fusion component 120 may transmit queries 720 and 722 to the VUE 504 and infrastructure device 506, respectively. The VUE 504 and the infrastructure device 506 may transmit responses 730 and 732, respectively. Accordingly, the fusion component 120 may obtain the information from one or more UEs. In some implementations, the RSU 510 may include sensors. The RSU 510 may treat any information from the sensors as information from another UE.

The fusion component 120 may transmit the set of extrinsic information 740 to the first VUE 502. The set of extrinsic information 740 may include one or more features 742 of the object or location. In some implementations, the set of extrinsic information 740 may include a trust level 744 associated with the one or more features 742. For example, the trust level 744 may be based on a number of UEs agreeing about the feature. For instance, the trust level 744 may be a ratio of the number of UEs agreeing about the feature to a total number of UEs providing information about the object.

The object information component 140 may receive the set of extrinsic information 740. The object information component 140 may determine whether to accept a feature 742 of the object from the set of extrinsic information 740. For example, if the extrinsic information 740 provides an additional feature 742 that is consistent with the intrinsic information 712, the object information component 140 may accept the additional feature 742. If the extrinsic information 740 provides a feature 742 that conflicts with the intrinsic information 712, the object information component 140 may compare the confidence level of the feature in the intrinsic information with the trust level of the feature in the extrinsic information. If the trust level is greater than the confidence level, the object information component 140 may accept the feature 742 from the set of extrinsic information 740.

The object information component 140 may select an autonomous driving action based on the accepted feature of the object or the location. For example, the action selection component 149 may select a braking action based on the presence of an object on the navigation path 514. Other examples of autonomous driving actions may include steering control, acceleration, warning sounds (e.g., horn), or activation of passenger restraints (e.g., seatbelts or airbags).

In some cases, the request 710 may include the intrinsic information 712 about the object detected by the VUE 502. The intrinsic information 712 may be used to identify the object among multiple objects tracked by the fusion component 120. In other cases (e.g., where the VUE 502 requests information for a location), the request 710 may not include any intrinsic information 712 about an object. For instance, the VUE 502 may request all information about a location when the VUE 502 is unable to detect a location (e.g., crossing 522) due to obstructions. In some implementations, the request 710 may be a request for a one-time set of extrinsic information about the object.

In some implementations, the request 710 may be a request for periodic transmissions of the extrinsic information. The request 710 may define a periodicity 714 for transmitting the set of extrinsic information. The periodicity 714 may be based on the confidence level of information about the object or an amount of information about the object. For instance, in some implementations, if the RSU 510 provides an amount of extrinsic information 740 that is less than a threshold, the request component 144 may increase the periodicity 714 (e.g., because the intrinsic information is relatively complete or accurate). Conversely, if the RSU 510 provides an amount of information that is greater than the first threshold (and less than a second threshold) the request component 144 may decrease the reporting threshold (e.g., because the extrinsic information indicates that the intrinsic information is relatively incomplete or erroneous).

In some implementations, the request 710 for information may indicate a threshold 716 for transmitting the set of extrinsic information. For instance, the RSU 510 may transmit the set of extrinsic information 740 when a difference between the intrinsic information 712 and the set of extrinsic information 740 is greater than a threshold. In an aspect, a difference between two sets of information may be expressed as a size of the extrinsic information (e.g., in bits or bytes), a number of different features, or a difference in the values for a feature. In some implementations, the difference may be weighted based on a confidence level of the intrinsic information and/or the trust level of the set of extrinsic information. The VUE 502 may configure the event triggering condition when a difference between the intrinsic information 712 and the set of extrinsic information 740 is greater than a first threshold for an application such as pedestrian avoidance. The VUE 502 may configure the event triggering condition when a difference between the intrinsic information 712 and the set of extrinsic information 740 is greater than a first threshold but less than a second threshold for an application such as vehicle safety. Additionally, the VUE 502 may disable or activate sensors based on the difference between the intrinsic information 712 and the set of extrinsic information 740. For example, the VUE 502 may disable one or more sensors when the difference between the intrinsic information 712 and the set of extrinsic information 740 is greater than the first threshold. In some implementations, the VUE 502 may stop providing intrinsic information on an object for a duration of time or during a specified time period. In another example, the VUE 502 may activate one or more sensors (e.g., previously disabled sensors) when a difference between the intrinsic information 712 and the set of extrinsic information 740 is greater than a first threshold but less than a second threshold.

Figure 8:
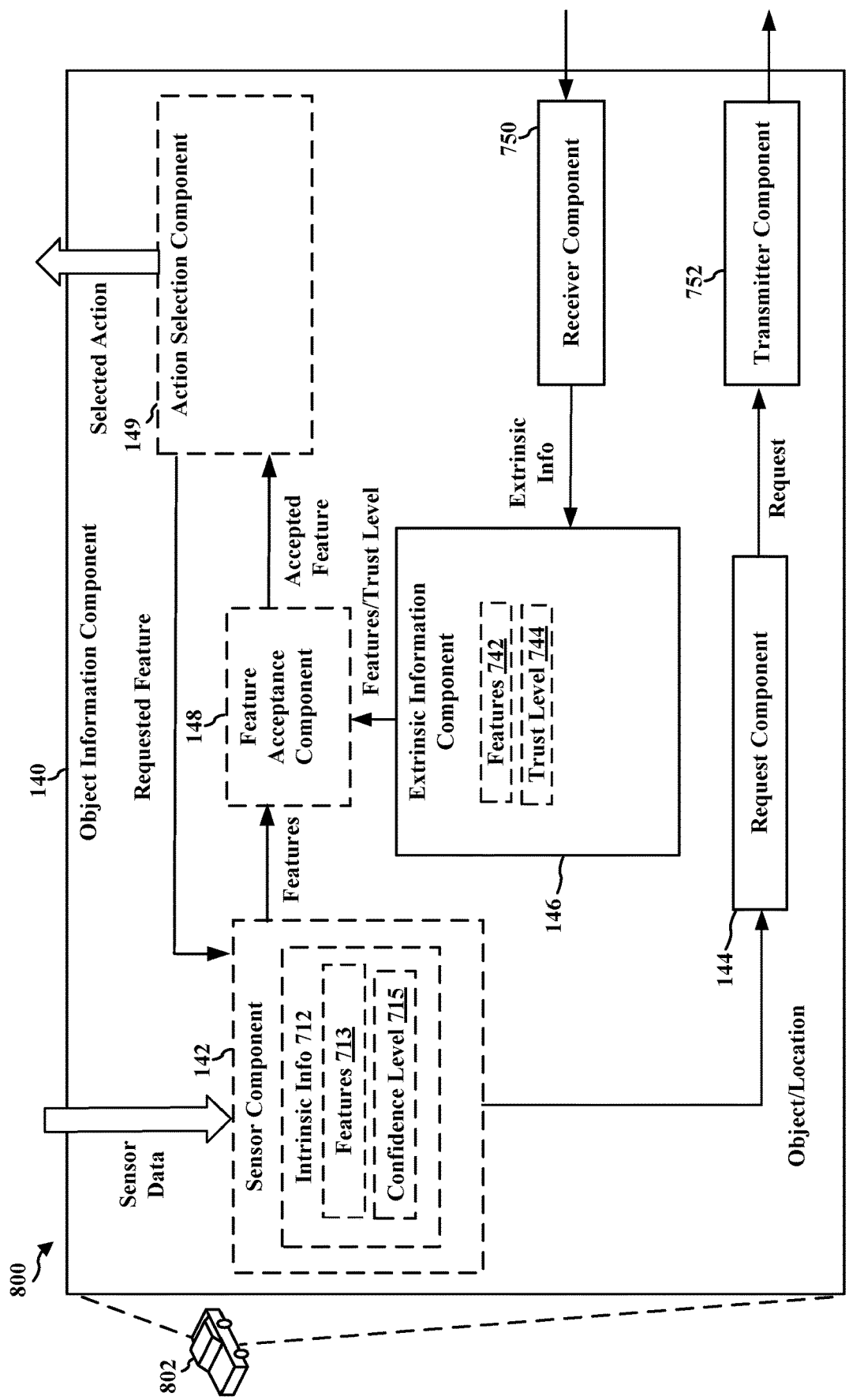
FIG. 8 is a conceptual data flow diagram illustrating the data flow between different means/components in an example VUE.

FIG. 8 is a conceptual data flow diagram 800 illustrating the data flow between different means/components in an example UE 802, which may be an example of the UE 104 including the object information component 140.

The sensor component 142 may receive sensor data from one or more individual sensors. The sensor component 142 may determine intrinsic information 712 based on the sensor data. The intrinsic information may include features 713. In some implementations, the sensor component 142 may determine a confidence level 715 for each feature 713. The sensor component 142 may provide the features 713 and the confidence level 715 to the feature acceptance component 148. In some implementations, the sensor component 142 may receive a requested feature from the action selection component 149. If the sensor component 142 has detected the requested feature, the sensor component 142 may provide the feature 713 to the feature acceptance component 148 in response to the requested feature. If the sensor component 142 has not detected the requested feature, the sensor component 142 may provide the object or location of the requested feature to the request component 144. In some implementations, the sensor component 142 may identify an object or location with insufficient or unreliable features 713 and provide the object or location to the request component 144.

The request component 144 may receive the object or location from the sensor component 142. The request component 144 may generate the request 710 for the object or location. In some implementations, the request component 144 may include the periodicity 714 in the request 710. In some implementations, the request component 144 may include the threshold 716 in the request 710. The request component 144 may transmit the request 710 via the transmitter component 752.

The receiver component 750 may receive various signals which may include extrinsic information 740, which may be transmitted by the RSU 510 in response to the request 710. The receiver component 750 may provide the extrinsic information 740 to the extrinsic information component 146.

The extrinsic information component 146 may receive the set of extrinsic information 740 via the receiver component 750. The extrinsic information component 146 may extract the features 742 from the set of extrinsic information 740. In some implementations, the extrinsic information component 146 may extract a trust level 744 for each feature 742. For example, the extrinsic information component 146 may decode the set of extrinsic information 740 according to a message format for extrinsic information. The extrinsic information component 146 may provide the feature 742 and/or the trust level 744 to the feature acceptance component 148.

The feature acceptance component may receive the features 713 from the sensor component 142 and receive the features 742 from the extrinsic information component 146. The feature acceptance component 148 may determine whether the features 742 are consistent with the features 713. For example, if the features 742 are additional features, the feature acceptance component 148 may accept the additional features. If there is a conflict between the features 713 and the features 742 to feature acceptance component 148 may determine which feature to accept. In an implementation, the feature acceptance component may accept the feature 742 if the trust level 744 is greater than the confidence level 715 of the feature 713. Accordingly, the feature acceptance component 148 may select the feature that is more reliable. The feature acceptance component 148 may provide the accepted features to the action selection component 149.

The action selection component 149 may receive the accepted features from the feature acceptance component 148. The action selection component 149 may be configured with rules for performing various autonomous driving actions. Various algorithms for performing autonomous driving actions known in the art of autonomous driving may make use of the accepted features to improve reliability. For example, the action selection component 149 may perform an automatic braking action if an accepted feature indicates that the object, following its current velocity, is likely to be located on the navigation path 514 at a time that the VUE 502 is projected to reach the object. The action selection component 149 may provide the selected action to a vehicle control system.

Figure 9:
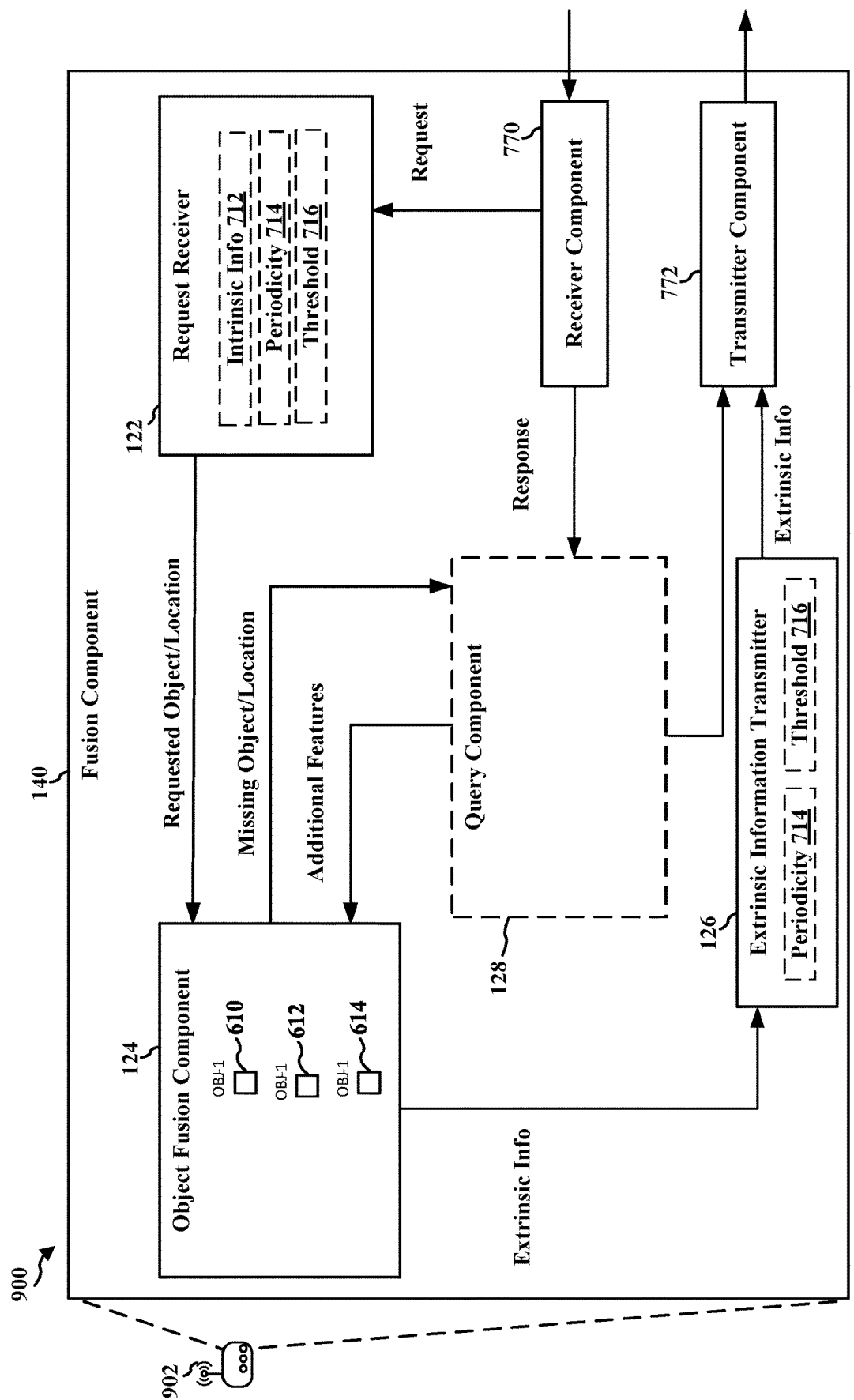
FIG. 9 is a conceptual data flow diagram illustrating the data flow between different means/components in an example RSU.

FIG. 9 is a conceptual data flow diagram 900 illustrating the data flow between different means/components in an example RSU 902, which may be an example of the RSU 510 including the fusion component 120.

The receiver component 770 may receive various signals which may include the request 710, which may be transmitted by the VUE 502. The receiver component 770 may provide the request 710 to the request receiver 122.

The request receiver 122 may receive the request 710 via the receiver component 770. The request receiver 122 may determine a requested object or location, for example, by decoding the request 710. In some implementations, the object or location may be identified by one or more features. In some implementations, the request 710 may include the intrinsic information 712 and any of the features 713 or the combination of all of the features 713 may be used to identify the requested object or location. The request receiver 122 may provide the requested object or location to the object fusion component 124. In some implementations, the request 710 may include a periodicity 714 or threshold 716 for reporting extrinsic information related to the object or location. The request receiver 122 may configure the extrinsic information transmitter 126 with the periodicity 714 or threshold 716 when received.

The object fusion component 124 may receive the requested object or location from the request receiver 122. Where the request 710 includes the intrinsic information 712, the object fusion component 124 may also receive the intrinsic information 712 from the request receiver 122. The object fusion component 124 may determine an object (e.g., one of objects 610, 612, 614) corresponding to the requested object or location. For example, the object fusion component 124 may select an object 612 that most closely matches the features of the requested object or location. In an implementation, the location feature may be prioritized for matching. For instance, the object 612 may match the requested object or location when a difference between the location of the requested object or location and the location of the object 612 is within a size feature of the object 612 or a size feature of the intrinsic information 712. That is, if the requested object and the object 612 occupy the same space, the requested object may match the object 612. The object fusion component 124 may request additional information about an object or location. For example, if the object fusion component 124 is unable to match the requested object or location or if the object 612 is missing one or more features, the object fusion component 124 may request features of the object or location from the query component 128. The object fusion component 124 may receive additional features from the query component 128.

The object fusion component 124 may determine extrinsic information for the VUE 502 based on the requested object or location, the intrinsic information 712, the stored information for the matching object 612, and the additional features from the query component 128. In an aspect, the extrinsic information may include a value for one or more features of the object or location that were not provided by the VUE 502. For example, the VUE 502 may provide a location of the object and a color (e.g., blue). The matching object 612 may have been reported by another VUE as a blue car traveling due west from the location at a speed of 10 miles per hour. The object fusion component 124 may determine that the features to be included in the extrinsic information are an object class of car, and a velocity of 10 miles per hour west. There object fusion component 124 may determine that the color and the location do not need to be included because such information would be redundant. In some implementations, the object fusion component 124 may determine the trust level 744 for each feature. For example, the trust level 744 may be a ratio of the number of UEs agreeing on the feature to a total number of UEs reporting the feature. For instance, if four UEs had reported the object 612, but only two of the UEs had reported the object class of car, the object fusion component 124 may determine a trust level of 0.5 for the feature of object type car. In another example, where the value of the feature is less discrete (e.g., speed), the object fusion component 124 may determine an average value for the feature and determine the trust level based on a deviation or range of the reported values. The object fusion component 124 may provide the set of extrinsic information to the extrinsic information transmitter 126.

The extrinsic information transmitter 126 may receive the set of extrinsic information from the object fusion component 124. The extrinsic information transmitter 126 may be configured with the periodicity 714 and/or threshold 716 by the request receiver 122. The extrinsic information transmitter 126 may transmit the set of extrinsic information 740 to the VUE 502 via the transmitter component 772. For example, the extrinsic information transmitter 126 may transmit the set of extrinsic information 740 in response to the request 710. When the extrinsic information transmitter 126 is configured with the periodicity 714, the extrinsic information transmitter 126 may periodically request the object fusion component 124 to update the set of extrinsic information. The extrinsic information transmitter 126 may transmit the updated set of extrinsic information based on the periodicity. When the extrinsic information transmitter 126 is configured with the threshold 716, the extrinsic information transmitter 126 may determine whether the amount of extrinsic information is greater than the threshold 716. The extrinsic information transmitter 126 may transmit the set of extrinsic information 740 when the amount of extrinsic information is greater than the threshold 716.

Figure 10:
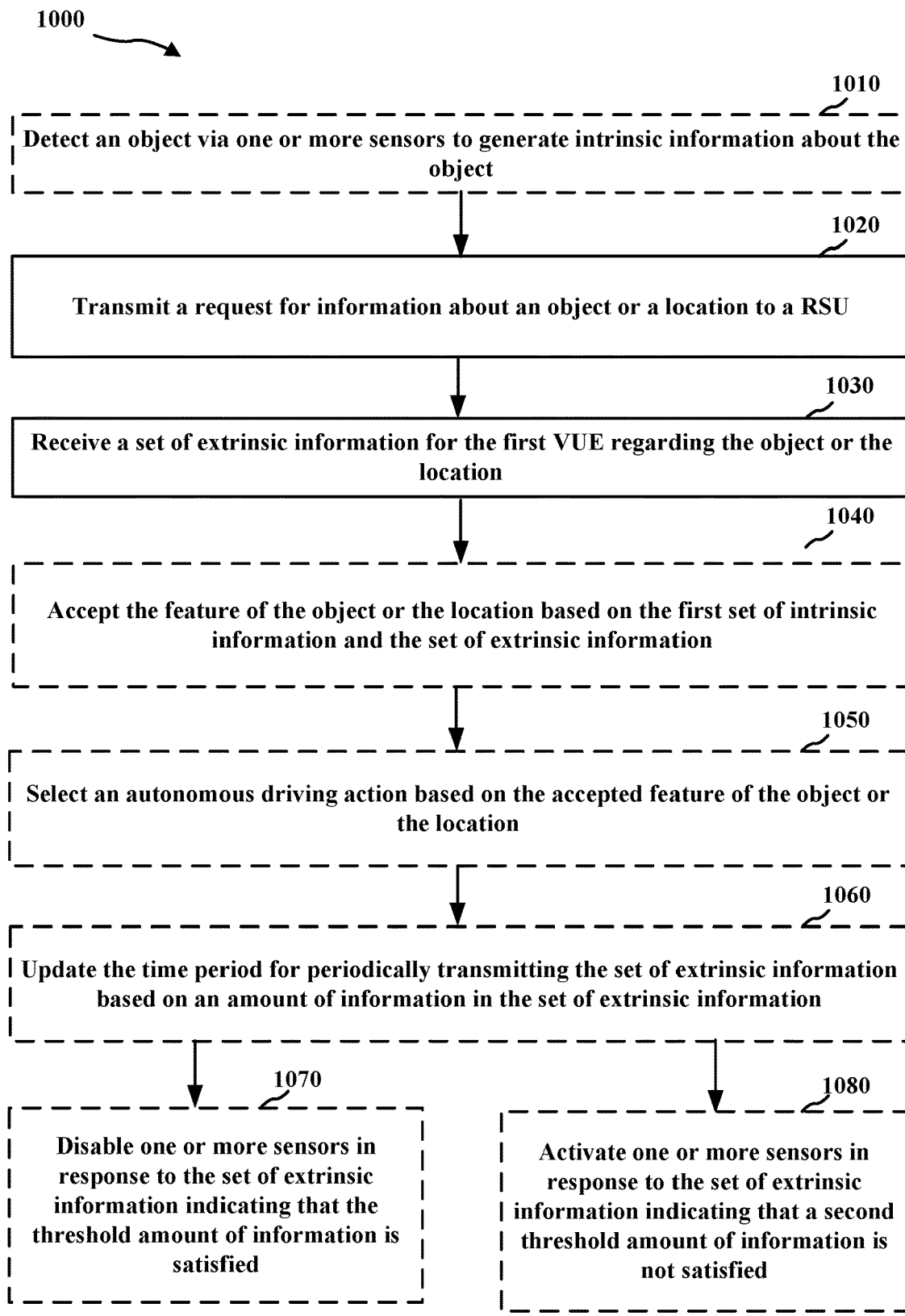
FIG. 10 is a flowchart of an example of a method of wireless communication for a VUE.

FIG. 10 is a flowchart of an example method 1000 for obtaining extrinsic information about an object or location. The method 1000 may be performed by a VUE such as a UE 104, which may include the memory 376 and which may be the entire UE 104 or a component of the UE 104 such as the object information component 140, the TX processor 368, the RX processor 356, or the controller/processor 359).

At block 1010, the method 1000 may optionally include detecting an object via one or more sensors to generate intrinsic information about the object. In an aspect, for example, the UE 104, the controller/processor 359, the TX processor 368, and/or the RX processor 356 may execute the object information component 140 and/or the sensor component 142 to detect an object (e.g., object 612) via one or more sensors to generate intrinsic information 712 about the object. Accordingly, the UE 104, the controller/processor 359, the TX processor 368, and/or the RX processor 356 executing the object information component 140 and/or the sensor component 142 may provide means for detecting an object via one or more sensors to generate intrinsic information about the object.

At block 1020, the method 1000 may include transmitting a request for information about an object or a location to a RSU. In an aspect, for example, the UE 104, the controller/processor 359 and/or the TX processor 368 may execute the object information component 140 and/or the request component 144 to transmit the request 710 for information about the object 612 or a location (e.g., crossing 522) to a RSU 510. In some implementations, the request 710 for information about the object 612 or the location includes the first set of intrinsic information 712. The object 612 may be an object detected by the first VUE, a geographic area, or an object on a map. In some implementations, the request 710 for information about the object 612 or the location indicates a time period for periodically transmitting the set of extrinsic information to the first VUE. In some implementations, the request 710 for information about the object 612 of the location indicates a threshold 716 amount of information for reporting. Accordingly, the UE 104, the controller/processor 359 and/or the TX processor 368 executing the object information component 140 and/or the request component 144 may provide means for transmitting a request for information about an object or a location to a RSU.

At block 1030, the method 1000 may include receiving a set of extrinsic information for the first VUE regarding the object or the location. In an aspect, for example, the UE 104, the controller/processor 359 and/or the RX processor 356 may execute the object information component 140 and/or the extrinsic information component 146 to receive a set of extrinsic information for the first VUE 502 regarding the object 612 or the location. Where the request 710 includes the first set of intrinsic information 712, set of extrinsic information 740 received by the first VUE does not include information from the first set of intrinsic information. In some implementations, the set of extrinsic information 740 includes a trust level 744 of a feature 742 of the object 612 or the location based on a number of VUEs agreeing about the feature. In some implementations, receiving the set of extrinsic information is in response to a difference between information provided by the first VUE to the RSU and the set of extrinsic information exceeding the threshold 716 amount of information. The threshold 716 may be received in the request 710 or may be based on an application of the object or location (e.g., pedestrian avoidance versus vehicle spacing). Accordingly, the UE 104, the controller/processor 359 and/or the RX processor 356 executing the object information component 140 and/or the extrinsic information component 146 may provide means for receiving a set of extrinsic information for the first VUE regarding the object or the location.

At block 1040, the method 1000 may optionally include accepting a feature of the object or the location based on the first set of intrinsic information and the set of extrinsic information. In an aspect, for example, the UE 104, the controller/processor 359, the TX processor 368, and/or the RX processor 356 may execute the object information component 140 and/or the feature acceptance component 148 to accept the feature of the object or the location based on the first set of intrinsic information and the set of extrinsic information. For example, the feature acceptance component 148 may accept the feature 742 from the extrinsic information 740 when the trust level 744 is greater than a confidence level 715 of a conflicting feature 713 in the intrinsic information 712. In some implementations, the feature acceptance component 148 may accept the feature 742 from the extrinsic information 740 when the trust level 744 is greater than a threshold (e.g., when no feature 713 is conflicting). Accordingly, the UE 104, the controller/processor 359, the TX processor 368, and/or the RX processor 356 executing the object information component 140 and/or the feature acceptance component 148 may provide means for accepting the feature of the object or the location based on the first set of intrinsic information and the set of extrinsic information.

At block 1050, the method 1000 may optionally include selecting an autonomous driving action based on the accepted feature of the object or the location. In an aspect, for example, the UE 104, the controller/processor 359, the TX processor 368, and/or the RX processor 356 may execute the object information component 140 and/or the action selection component 149 to select an autonomous driving action based on the accepted feature of the object or the location. Accordingly, the UE 104, the controller/processor 359, the TX processor 368, and/or the RX processor 356 executing the object information component 140 and/or the action selection component 149 may provide means for selecting an autonomous driving action based on the accepted feature of the object or the location.

At block 1060, the method 1000 may optionally include updating a time period for periodically transmitting the set of extrinsic information based on an amount of information in the set of extrinsic information. In an aspect, for example, the UE 104, the controller/processor 359, the TX processor 368, and/or the RX processor 356 may execute the object information component 140 and/or the request component 144 to update the time period (e.g., periodicity 714) for periodically transmitting the set of extrinsic information based on an amount of information in the set of extrinsic information. For example, if the amount of information in the set of extrinsic information for a periodic transmission is less than a first threshold, the request component 144 may increase the periodicity 714. If the amount of information in the set of extrinsic information for a periodic transmission is greater than the first threshold but less than a second threshold, the request component 144 may decrease the periodicity 714. Accordingly, the UE 104, the controller/processor 359, the TX processor 368, and/or the RX processor 356 executing the object information component 140 and/or the request component 144 may provide means for updating a time period for periodically transmitting the set of extrinsic information based on an amount of information in the set of extrinsic information.

At block 1070, the method 1000 may optionally include disabling one or more sensors in response to the set of extrinsic information indicating that the threshold amount of information is satisfied. In an aspect, for example, the UE 104, the controller/processor 359, the TX processor 368, and/or the RX processor 356 may execute the object information component 140 and/or the sensor component 142 to disable one or more sensors in response to the set of extrinsic information indicating that the threshold 716 amount of information is satisfied. That is, the sensor component 142 may disable a sensor in response receiving the threshold amount of extrinsic information, for example, because the extrinsic information may be more accurate. Accordingly, the UE 104, the controller/processor 359, the TX processor 368, and/or the RX processor 356 executing the object information component 140 and/or the sensor component 142 may provide means for disabling one or more sensors in response to the set of extrinsic information indicating that the threshold amount of information is satisfied.

At block 1080, the method 1000 may optionally include activating one or more sensors in response to the set of extrinsic information indicating that a second threshold amount of information is not satisfied. In an aspect, for example, the UE 104, the controller/processor 359, the TX processor 368, and/or the RX processor 356 may execute the object information component 140 and/or the sensor component 142 to activate one or more sensors in response to the set of extrinsic information indicating that a second threshold amount of information is not satisfied. Accordingly, the UE 104, the controller/processor 359, the TX processor 368, and/or the RX processor 356 executing the object information component 140 and/or the sensor component 142 may provide means for activating one or more sensors in response to the set of extrinsic information indicating that a second threshold amount of information is not satisfied.

Figure 11:
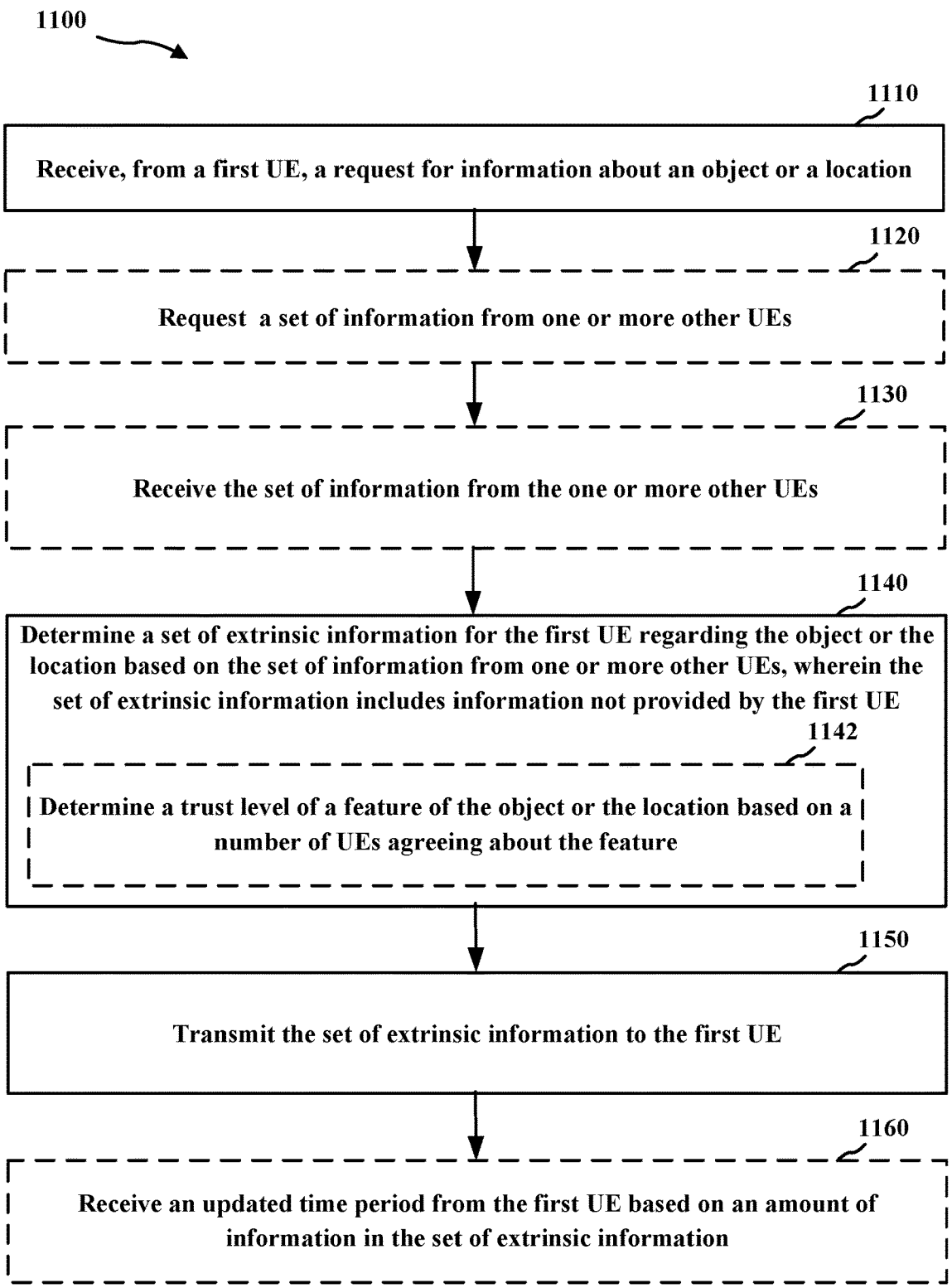
FIG. 11 is a flowchart of an example method of wireless communication for a RSU.

FIG. 11 is a flowchart of an example method 1100 for providing extrinsic information about an object or location to a VUE. The method 1100 may be performed by a RSU (such as the RSU 107, which may include the memory 376 and which may be the entire RSU 107 or a component of the RSU 107 such as the fusion component 120, the TX processor 316, the RX processor 370, or the controller/processor 375). The method 1100 may be performed in conjunction with a VUE performing the method 1000.

At block 1110, the method 1100 may include receiving, from a first UE, a request for information about an object or a location. In an aspect, for example, the RSU 107, the controller/processor 375 and/or the RX processor 370 may execute the fusion component 120 and/or the request receiver 122 to receive, from the first UE (e.g., VUE 502), a request for information about an object 612 or a location (e.g., crossing 522). In some implementations, the request for information about the object 612 or the location includes a first set of intrinsic information 712 provided by the first UE. Accordingly, the RSU 107, the controller/processor 375 and/or the RX processor 370 executing the fusion component 120 and/or the request receiver 122 may provide means for receiving, from a first UE, a request for information about an object or a location.

At block 1120, the method 1100 may optionally include requesting, from the one or more other UEs, the set of information from one or more other UEs. In an aspect, for example, the RSU 107, the controller/processor 375 and/or the TX processor 316 may execute the fusion component 120 and/or the query component 128 to request, from the one or more other UEs (e.g., VUE 504, infrastructure device 506, or pedestrian device 508), the set of information from one or more other UEs. Accordingly, the RSU 107, the controller/processor 375, the TX processor 316, and/or the RX processor 370 executing the fusion component 120 and/or the query component 128 may provide means for requesting, from the one or more other UEs, the set of information from one or more other UEs.

At block 1130, the method 1100 may include receiving, from the one or more other UEs, the set of information from one or more other UEs. In an aspect, for example, the RSU 107, the controller/processor 375 and/or the RX processor 370 may execute the fusion component 120 and/or the query component 128 to receive, from the one or more other UEs, the set of information from one or more other UEs (e.g., VUE 504, infrastructure device 506, or pedestrian device 508). Accordingly, the RSU 107, the controller/processor 375, the TX processor 316, and/or the RX processor 370 executing the fusion component 120 and/or the query component 128 may provide means for receiving, from the one or more other UEs, the set of information from one or more other UEs.

At block 1140, the method 1100 may include determining a set of extrinsic information for the first UE regarding the object or the location based on a set of information from one or more other UEs. The set of extrinsic information includes information not provided by the first UE. In an aspect, for example, the RSU 107, the controller/processor 375, the TX processor 316, and/or the RX processor 370 may execute the fusion component 120 and/or the object fusion component 124 to determine the set of extrinsic information 740 for the first UE regarding the object 612 or the location based on a set of information from one or more other UEs (e.g., VUE 504, infrastructure device 506, or pedestrian device 508). The set of extrinsic information 740 may information includes combined information from the one or more other UEs at a reporting time minus information from the first UE at the reporting time. In an aspect, at sub-block 1142, the block 1140 may optionally include determining a trust level of a feature of the object or the location based on a number of UEs agreeing about the feature. Accordingly, the RSU 107, the controller/processor 375, the TX processor 316, and/or the RX processor 370 executing the fusion component 120 and/or the object fusion component 124 may provide means for determining a set of extrinsic information for the first UE regarding the object or the location based on a set of information from one or more other UEs, wherein the set of extrinsic information includes information not provided by the first UE.

At block 1150, the method 1100 may include transmitting the set of extrinsic information to the first UE. In an aspect, for example, the RSU 107, the controller/processor 375, the TX processor 316, and/or the RX processor 370 may execute the fusion component 120 and/or the extrinsic information transmitter 126 to transmit the set of extrinsic information to the first UE. In some implementations, the block 1150 may be performed in response to a difference between information provided by the first UE and the set of extrinsic information exceeding a threshold amount of information. For example, the threshold amount of information may be indicated by the request 710. As another example, the threshold amount of information may be based on an application of the object or the location. Accordingly, the RSU 107, the controller/processor 375, the TX processor 316, and/or the RX processor 370 executing the fusion component 120 and/or the extrinsic information transmitter 126 may provide means for transmitting the set of extrinsic information to the first UE.

At block 1160, the method 1100 may include receiving an updated time period from the first UE based on an amount of information in the set of extrinsic information. In an aspect, for example, the RSU 107, the controller/processor 375, the TX processor 316, and/or the RX processor 370 may execute the fusion component 120 and/or the request receiver 122 to receive an updated time period from the first UE based on an amount of information in the set of extrinsic information. Accordingly, the RSU 107, the controller/processor 375, the TX processor 316, and/or the RX processor 370 executing the fusion component 120 and/or the request receiver 122 may provide means for receiving an updated time period from the first UE based on an amount of information in the set of extrinsic information.

The following provides an overview of further aspects of the present disclosure. These aspects may be combined with other aspects, examples, or embodiments discussed elsewhere herein.

Aspect 1 is a method of wireless communication at a first VUE. The method includes transmitting a request for information about an object or a location to a RSU and receiving a set of extrinsic information for the first VUE regarding the object or the location. The set of extrinsic information includes information not provided by the first VUE to the RSU on the object or the location.

In Aspect 2, the request for information about the object or the location of Aspect 1 includes a first set of intrinsic information. The set of extrinsic information received by the first VUE does not include information from the first set of intrinsic information.

In Aspect 3, the set of extrinsic information of Aspect 2 includes a trust level of a feature of the object or the location based on a number of UEs agreeing about the feature, and the method of Aspect 2 further includes accepting the feature of the object or the location based on the first set of intrinsic information and the set of extrinsic information.

In Aspect 4, the method of Aspect 3 further includes selecting an autonomous driving action based on the accepted feature of the object or the location.

In Aspect 5, the request for information about the object or the location of any of Aspects 1-4 indicates a time period for periodically transmitting the set of extrinsic information to the first VUE, and the set of extrinsic information includes information from one or more other VUEs at a reporting time minus information provided by the first VUE at the reporting time.

In Aspect 6, the method of Aspect 5 further includes updating the time period for periodically transmitting the set of extrinsic information based on an amount of information in the set of extrinsic information.

In Aspect 7, receiving the set of extrinsic information of any of Aspects 1-4 is in response to a difference between information provided by the first VUE to the RSU and the set of extrinsic information exceeding a threshold amount of information.

In Aspect 8, the request for information about the object or the location of Aspect 7 indicates the threshold amount of information.

In Aspect 9, the threshold amount of information of Aspect 7 is based on an application of the object or the location.

In Aspect 10, the method of Aspect 9 further includes disabling one or more sensors in response to the set of extrinsic information indicating that the threshold amount of information is satisfied.

In Aspect 11, the method of Aspect 9 further includes activating one or more sensors in response to the set of extrinsic information indicating that a second threshold amount of information is not satisfied.

In Aspect 12, the object of any of Aspects 1-11 is one of: an object detected by the first VUE, a geographic area, or an object on a map.

Aspect 13 is method of wireless communication. The method includes receiving, from a first UE, a request for information about an object or a location, determining a set of extrinsic information for the first UE regarding the object or the location based on a set of information from one or more other UEs, and transmitting the set of extrinsic information to the first UE. The set of extrinsic information includes information not provided by the first UE.

In Aspect 14, the request for information about the object or the location of Aspect 13 includes a first set of intrinsic information provided by the first UE.

In Aspect 15, the method of Aspect 14, further includes requesting, from the one or more other UEs, the set of information from one or more other UEs and receiving the set of information from the one or more other UEs.

In Aspect 16, determining the set of extrinsic information for the first UE of any of Aspects 13-15 includes determining a trust level of a feature of the object or the location based on a number of UEs agreeing about the feature.

In Aspect 17, the request for information about the object or the location of any of Aspects 13-16 indicates a time period for periodically transmitting the set of extrinsic information to the first UE, and the set of extrinsic information includes combined information from the one or more other UEs at a reporting time minus information from the first UE at the reporting time.

In Aspect 18, the method of Aspect 17 further includes receiving an updated time period from the first UE based on an amount of information in the set of extrinsic information.

In Aspect 19, transmitting the set of extrinsic information of any of Aspects 13-16 to the first UE is in response to a difference between information provided by the first UE and the set of extrinsic information exceeding a threshold amount of information.

In Aspect 20, the request for information about the object or the location of Aspect 19 indicates the threshold amount of information.

In Aspect 21, the threshold amount of information of Aspect 19 is based on an application of the object or the location.

In Aspect 22, the object of any of Aspects 13-21 is one of: an object detected at the first UE, a geographic area, or an object on a map.

Aspect 23 is a VUE. The VUE includes a memory storing computer-executable instructions and at least one processor coupled with the memory and configured to execute the instructions. The at least one processor is configured to execute the instructions to transmit a request for information about an object or a location to a RSU and receive a set of extrinsic information for the VUE regarding the object or the location. The set of extrinsic information includes information not provided by the VUE to the RSU on the object or the location.

In Aspect 24, the request for information about the object or the location of Aspect 23 includes a first set of intrinsic information, and the set of extrinsic information received by the VUE does not include information from the first set of intrinsic information.

In Aspect 25, the set of extrinsic information of Aspect 24 includes a trust level of a feature of the object or the location based on a number of UEs agreeing about the feature, and the at least one processor is configured to accept the feature of the object or the location based on the first set of intrinsic information and the set of extrinsic information.

In Aspect 26, the at least one processor of Aspect 25 is configured to select an autonomous driving action based on the accepted feature of the object or the location.

In Aspect 27, the request for information about the object or the location of any of Aspects 23-26 indicates a time period for periodically transmitting the set of extrinsic information to the VUE, and the set of extrinsic information includes information from one or more other VUEs at a reporting time minus information provided by the VUE at the reporting time.

In Aspect 28, the at least one processor of Aspect 27 is configured to update the time period for periodically transmitting the set of extrinsic information based on an amount of information in the set of extrinsic information.

In Aspect 29, the at least one processor of any of Aspects 23-26 is configured to receive the set of extrinsic information in response to a difference between information provided by the VUE to the RSU and the set of extrinsic information exceeding a threshold amount of information.

In Aspect 30, the request for information about the object or the location of Aspect 29 indicates the threshold amount of information.

In Aspect 31, the threshold amount of information of Aspect 29 is based on an application of the object or the location.

In Aspect 32, the at least one processor of Aspect 31 is configured to disable one or more sensors in response to the set of extrinsic information indicating that the threshold amount of information is satisfied.

In Aspect 33, the at least one processor of Aspect 31 is configured to activate one or more sensors in response to the set of extrinsic information indicating that a second threshold amount of information is not satisfied.

In Aspect 34, the object any of Aspects 23-33 is one of: an object detected by the VUE, a geographic area, or an object on a map.

Aspect 35, is an apparatus for wireless communication. The apparatus includes a memory storing computer-executable instructions and at least one processor coupled with the memory and configured to execute the instructions. The at least one processor is configured to execute the instructions to receive, from a first UE, a request for information about an object or a location, determine a set of extrinsic information for the first UE regarding the object or the location based on a set of information from one or more other UEs, and transmit the set of extrinsic information to the first UE. The set of extrinsic information includes information not provided by the first UE.

In Aspect 36, the request for information about the object or the location of Aspect 35 includes a first set of intrinsic information provided by the first UE.

In Aspect 37, the at least one processor of Aspect 36 is configured to request, from the one or more other UEs, the set of information from one or more other UEs and receive the set of information from the one or more other UEs.

In Aspect 38, the at least one processor of any of Aspects 35-37 is configured to determine a trust level of a feature of the object or the location based on a number of UEs agreeing about the feature.

In Aspect 39, the request for information about the object or the location of any of Aspects 35-38 indicates a time period for periodically transmitting the set of extrinsic information to the first UE, and the set of extrinsic information includes combined information from the one or more other UEs at a reporting time minus information from the first UE at the reporting time.

In Aspect 40, the at least one processor of Aspect 39 is configured to receive an updated time period from the first UE based on an amount of information in the set of extrinsic information.

In Aspect 41, the at least one processor of any of Aspects 35-38 is configured to transmit the set of extrinsic information to the first UE in response to a difference between information provided by the first UE and the set of extrinsic information exceeding a threshold amount of information.

In Aspect 42, the request for information about the object or the location of Aspect 41 indicates the threshold amount of information.

In Aspect 43, the threshold amount of information of Aspect 41 is based on an application of the object or the location.

In Aspect 44, the object of any of Aspects 35-43 is one of: an object detected at the first UE, a geographic area, or an object on a map.

Aspect 45 is a VUE. The VUE includes means for transmitting a request for information about an object or a location to a RSU, and means for receiving a set of extrinsic information for the VUE regarding the object or the location. The set of extrinsic information includes information not provided by the VUE to the RSU on the object or the location.

In Aspect 46, the request for information about the object or the location of Aspect 45 includes a first set of intrinsic information, and the set of extrinsic information received by the VUE does not include information from the first set of intrinsic information.

In Aspect 47, the set of extrinsic information of Aspect 46 includes a trust level of a feature of the object or the location based on a number of UEs agreeing about the feature, and the VUE further includes means for accepting the feature of the object or the location based on the first set of intrinsic information and the set of extrinsic information.

In Aspect 48, the VUE of Aspect 47 further includes means for selecting an autonomous driving action based on the accepted feature of the object or the location.

In Aspect 49, the request for information about the object or the location of any of Aspects 45-48 indicates a time period for periodically transmitting the set of extrinsic information to the VUE, and the set of extrinsic information includes information from one or more other VUEs at a reporting time minus information provided by the VUE at the reporting time.

In Aspect 50, the means for requesting information of Aspect 49 is configured to update the time period for periodically transmitting the set of extrinsic information based on an amount of information in the set of extrinsic information.

In Aspect 51, the means for receiving the set of extrinsic information of any of Aspects 45-48 is configured to receive the set of extrinsic information in response to a difference between information provided by the VUE to the RSU and the set of extrinsic information exceeding a threshold amount of information.

In Aspect 52, the request for information about the object or the location of Aspect 51 indicates the threshold amount of information.

In Aspect 53, the threshold amount of information of Aspect 51 is based on an application of the object or the location.

In Aspect 54, the VUE of Aspect 53 further includes means for disabling one or more sensors in response to the set of extrinsic information indicating that the threshold amount of information is satisfied.

In Aspect 55, the VUE of Aspect 53 further includes means for activating one or more sensors in response to the set of extrinsic information indicating that a second threshold amount of information is not satisfied.

In Aspect 56, the object of any of Aspects 45-55 is one of: an object detected by the VUE, a geographic area, or an object on a map.

Aspect 57 is an apparatus for wireless communication. The apparatus includes means for receiving, from a first UE, a request for information about an object or a location, means for determining a set of extrinsic information for the first UE regarding the object or the location based on a set of information from one or more other UEs, and means for transmitting the set of extrinsic information to the first UE. The set of extrinsic information includes information not provided by the first UE.

In Aspect 58, the request for information about the object or the location of Aspect 57 includes a first set of intrinsic information provided by the first UE.

In Aspect 59, the apparatus of Aspect 58, further includes means for requesting, from the one or more other UEs, the set of information from one or more other UEs and for receiving the set of information from the one or more other UEs.

In Aspect 60, the means for determining the set of extrinsic information for the first UE of any of Aspects 57-59 is configured to determine a trust level of a feature of the object or the location based on a number of UEs agreeing about the feature.

In Aspect 61, the request for information about the object or the location of Aspect 57 indicates a time period for periodically transmitting the set of extrinsic information to the first UE, and the set of extrinsic information includes combined information from the one or more other UEs at a reporting time minus information from the first UE at the reporting time.

In Aspect 62, the means for receiving the request for information of Aspect 61 is configured to receive an updated time period from the first UE based on an amount of information in the set of extrinsic information.

In Aspect 63, the means for transmitting the set of extrinsic information to the first UE of any of Aspects 57-59 is configured to transmit the set of extrinsic information in response to a difference between information provided by the first UE and the set of extrinsic information exceeding a threshold amount of information.

In Aspect 64, the request for information about the object or the location of Aspect 63 indicates the threshold amount of information.

In Aspect 65, the threshold amount of information of Aspect 63 is based on an application of the object or the location.

In Aspect 66, the object of any of Aspects 57-66 is one of: an object detected at the first UE, a geographic area, or an object on a map.

Aspect 67 is a non-transitory computer-readable medium storing computer executable code. The code when executed by a processor of a first VUE instructs the processor to transmit a request for information about an object or a location to a RSU and receive a set of extrinsic information for the first VUE regarding the object or the location. The set of extrinsic information includes information not provided by the first VUE to the RSU on the object or the location.

In Aspect 68, the request for information about the object or the location of Aspect 67 includes a first set of intrinsic information, and the set of extrinsic information received by the first VUE does not include information from the first set of intrinsic information.

In Aspect 69, the set of extrinsic information of Aspect 68 includes a trust level of a feature of the object or the location based on a number of UEs agreeing about the feature. The non-transitory computer-readable medium further includes code to accept the feature of the object or the location based on the first set of intrinsic information and the set of extrinsic information.

In Aspect 70, the non-transitory computer-readable medium of Aspect 69 further includes code to select an autonomous driving action based on the accepted feature of the object or the location.

In Aspect 71, the request for information about the object or the location of any of Aspects 67-70 indicates a time period for periodically transmitting the set of extrinsic information to the first VUE, and the set of extrinsic information includes information from one or more other VUEs at a reporting time minus information provided by the first VUE at the reporting time.

In Aspect 72, the non-transitory computer-readable medium of Aspect 71 further includes code to update the time period for periodically transmitting the set of extrinsic information based on an amount of information in the set of extrinsic information.

In Aspect 73, the code to receive the set of extrinsic information of any of Aspects 67-70 includes code to receive the set of extrinsic information in response to a difference between information provided by the first VUE to the RSU and the set of extrinsic information exceeding a threshold amount of information.

In Aspect 74, the request for information about the object or the location of Aspect 73 indicates the threshold amount of information.

In Aspect 75, the threshold amount of information of Aspect 73 is based on an application of the object or the location.

In Aspect 76, the non-transitory computer-readable medium of Aspect 75 further includes code to disable one or more sensors in response to the set of extrinsic information indicating that the threshold amount of information is satisfied.

In Aspect 77, the non-transitory computer-readable medium of Aspect 75 further includes code to activate one or more sensors in response to the set of extrinsic information indicating that a second threshold amount of information is not satisfied.

In Aspect 78, the object of any of Aspects 67-77 is one of: an object detected by the first VUE, a geographic area, or an object on a map.

Aspect 79 is a non-transitory computer-readable medium storing computer executable code. The code when executed by a processor instructs the processor to receive, from a first UE, a request for information about an object or a location, determine a set of extrinsic information for the first UE regarding the object or the location based on a set of information from one or more other UEs, and transmit the set of extrinsic information to the first UE. The set of extrinsic information includes information not provided by the first UE.

In Aspect 80, the request for information about the object or the location of Aspect 79 includes a first set of intrinsic information provided by the first UE.

In Aspect 81, the non-transitory computer-readable medium of Aspect 80, further includes code to request, from the one or more other UEs, the set of information from one or more other UEs and receive the set of information from the one or more other UEs.

In Aspect 82, the code to determine the set of extrinsic information for the first UE of any of Aspects 79-81 includes code to determine a trust level of a feature of the object or the location based on a number of UEs agreeing about the feature.

In Aspect 83, the request for information about the object or the location any of Aspects 79-82 indicates a time period for periodically transmitting the set of extrinsic information to the first UE, and the set of extrinsic information includes combined information from the one or more other UEs at a reporting time minus information from the first UE at the reporting time.

In Aspect 84, the non-transitory computer-readable medium of Aspect 83 further includes code to receive an updated time period from the first UE based on an amount of information in the set of extrinsic information.

In Aspect 85, the code to transmit the set of extrinsic information to the first UE of any of Aspects 79-82 includes code to transmit the set of extrinsic information in response to a difference between information provided by the first UE and the set of extrinsic information exceeding a threshold amount of information.

In Aspect 86, the request for information about the object or the location of Aspect 85 indicates the threshold amount of information.

In Aspect 87, the threshold amount of information of Aspect 85 is based on an application of the object or the location.

In Aspect 88, the object of any of Aspects 79-87 is one of: an object detected at the first UE, a geographic area, or an object on a map.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The invention claimed is:

1. A method of wireless communication, comprising, at a first vehicle user equipment (VUE):
   transmitting a request for information about an object or a location to a road side unit (RSU), wherein the request for information about the object or the location includes a first set of intrinsic information; and
   receiving a set of extrinsic information for the first VUE regarding the object or the location, wherein the set of extrinsic information includes information not provided by the first VUE to the RSU about the object or the location, wherein the set of extrinsic information does not include information from the first set of intrinsic information.

2. The method of claim 1, wherein the set of extrinsic information includes a trust level of a feature of the object or the location based on a number of user equipment (UEs) agreeing about the feature, the method further comprising accepting the feature of the object or the location based on the first set of intrinsic information and the set of extrinsic information.

3. The method of claim 2, further comprising selecting an autonomous driving action based on the accepted feature of the object or the location.

4. The method of claim 1, wherein the request for information about the object or the location indicates a time period for periodically transmitting the set of extrinsic information to the first VUE, wherein the set of extrinsic information includes information from one or more other VUEs at a reporting time minus information provided by the first VUE at the reporting time.

5. The method of claim 4, further comprising updating the time period for periodically transmitting the set of extrinsic information based on an amount of information in the set of extrinsic information.

6. The method of claim 1, wherein receiving the set of extrinsic information is in response to a difference between information provided by the first VUE to the RSU and the set of extrinsic information exceeding a threshold amount of information.

7. The method of claim 6, wherein the request for information about the object or the location indicates the threshold amount of information.

8. The method of claim 6, wherein the threshold amount of information is based on an application of the object or the location.

9. The method of claim 8, further comprising disabling one or more sensors in response to the set of extrinsic information indicating that the threshold amount of information is satisfied.

10. The method of claim 8, further comprising activating one or more sensors in response to the set of extrinsic information indicating that a second threshold amount of information is not satisfied.

11. The method of claim 1, wherein the object is one of: an object detected by the first VUE, a geographic area, or an object on a map.

12. A method of wireless communication, comprising:
receiving, from a first user equipment (UE), a request for information about an object or a location, wherein the request for information about the object or the location includes a first set of intrinsic information;
determining a set of extrinsic information for the first UE regarding the object or the location based on a set of information from one or more other UEs, wherein the set of extrinsic information includes information not provided by the first UE, wherein the set of extrinsic information does not include information from the first set of intrinsic information; and
transmitting the set of extrinsic information to the first UE.

13. The method of claim 12, further comprising:
requesting, from the one or more other UEs, the set of information from one or more other UEs; and
receiving the set of information from the one or more other UEs.

14. The method of claim 12, wherein determining the set of extrinsic information for the first UE comprises determining a trust level of a feature of the object or the location based on a number of UEs agreeing about the feature.

15. The method of claim 12, wherein the request for information about the object or the location indicates a time period for periodically transmitting the set of extrinsic information to the first UE, wherein the set of extrinsic information includes combined information from the one or more other UEs at a reporting time minus information from the first UE at the reporting time.

16. The method of claim 15, further comprising receiving an updated time period from the first UE based on an amount of information in the set of extrinsic information.

17. The method of claim 12, wherein transmitting the set of extrinsic information to the first UE is in response to a difference between information provided by the first UE and the set of extrinsic information exceeding a threshold amount of information.

18. The method of claim 17, wherein the request for information about the object or the location indicates the threshold amount of information.

19. The method of claim 17, wherein the threshold amount of information is based on an application of the object or the location.

20. The method of claim 12, wherein the object is one of: an object detected at the first UE, a geographic area, or an object on a map.

21. A vehicular user equipment (VUE) comprising:
a memory storing computer-executable instructions; and
at least one processor coupled with the memory and configured to execute the instructions to:
transmit a request for information about an object or a location to a road side unit (RSU), wherein the request for information about the object or the location includes a first set of intrinsic information; and
receive a set of extrinsic information for the VUE regarding the object or the location, wherein the set of extrinsic information includes information not provided by the VUE to the RSU about the object or the location, wherein the set of extrinsic information does not include information from the first set of intrinsic information.

22. The VUE of claim 21, wherein the request for information about the object or the location includes a first set of intrinsic information, wherein the set of extrinsic information received by the VUE does not include information from the first set of intrinsic information.

23. The VUE of claim 22, wherein the set of extrinsic information includes a trust level of a feature of the object or the location based on a number of VUEs agreeing about the feature, wherein the at least one processor is configured to accept the feature of the object or the location based on the first set of intrinsic information and the set of extrinsic information.

24. The VUE of claim 23, wherein the at least one processor is configured to select an autonomous driving action based on the accepted feature of the object or the location.

25. The VUE of claim 21, wherein the request for information about the object or the location indicates a time period for periodically transmitting the set of extrinsic information to the VUE, wherein the set of extrinsic information includes information from one or more other VUEs at a reporting time minus information provided by the VUE at the reporting time.

26. The VUE of claim 25, wherein the at least one processor is configured to update the time period for periodically transmitting the set of extrinsic information based on an amount of information in the set of extrinsic information.

27. The VUE of claim 21, wherein the at least one processor is configured to receive the set of extrinsic information in response to a difference between information provided by the VUE to the RSU and the set of extrinsic information exceeding a threshold amount of information.

28. An apparatus for wireless communication, comprising:
  a memory storing computer-executable instructions; and
  at least one processor coupled with the memory and configured to execute the instructions to:
    receive, from a first user equipment (UE), a request for information about an object or a location, wherein the request for information about the object or the location includes a first set of intrinsic information;
    determine a set of extrinsic information for the first UE regarding the object or the location based on a set of information from one or more other UEs, wherein the set of extrinsic information includes information not provided by the first UE, wherein the set of extrinsic information does not include information from the first set of intrinsic information; and
    transmit the set of extrinsic information to the first UE.

29. The apparatus of claim 28, wherein the at least one processor is further configured to:
  request, from the one or more other UEs, the set of information from one or more other UEs; and
  receive the set of information from the one or more other UEs.

30. The apparatus of claim 28, wherein the at least one processor is configured to determine the set of extrinsic information for the first UE by determining a trust level of a feature of the object or the location based on a number of UEs agreeing about the feature.

31. The apparatus of claim 28, wherein the request for information about the object or the location indicates a time period for periodically transmitting the set of extrinsic information to the first UE, wherein the set of extrinsic information includes combined information from the one or more other UEs at a reporting time minus information from the first UE at the reporting time.

32. The apparatus of claim 31, wherein the at least one processor is further configured to receive an updated time period from the first UE based on an amount of information in the set of extrinsic information.

33. The apparatus of claim 28, wherein the at least one processor is configured to cause the apparatus to transmit the set of extrinsic information to the first UE is in response to a difference between information provided by the first UE and the set of extrinsic information exceeding a threshold amount of information.

34. The apparatus of claim 33, wherein the request for information about the object or the location indicates the threshold amount of information.

35. The apparatus of claim 33, wherein the threshold amount of information is based on an application of the object or the location.

36. The apparatus of claim 28, wherein the object is one of: an object detected at the first UE, a geographic area, or an object on a map.

\* \* \* \* \*